US007948939B2

(12) United States Patent
Sugaya et al.

(10) Patent No.: US 7,948,939 B2
(45) Date of Patent: May 24, 2011

(54) METHOD AND APPARATUS TO PERFORM SYNCHRONIZATION IN AN AD-HOC NETWORK

(75) Inventors: Shigeru Sugaya, Kanagawa (JP); Mitsuhiro Suzuki, Chiba (JP); Kazuyuki Sakoda, Tokyo (JP); Kenzo Nishikawa, Kanagawa (JP); Chihiro Fujita, Kanagawa (JP); Yuichi Morioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 11/062,952

(22) Filed: Feb. 23, 2005

(65) Prior Publication Data

US 2006/0068820 A1  Mar. 30, 2006

(30) Foreign Application Priority Data

Mar. 4, 2004  (JP) ................... 2004-060115

(51) Int. Cl.
*H04W 4/00* (2009.01)
*H04W 72/00* (2009.01)
(52) U.S. Cl. ........ 370/329; 370/338; 455/450; 455/41.1
(58) Field of Classification Search .................. 370/468, 370/310, 477, 236, 336, 347, 350, 329, 330, 370/338; 455/450–453, 41.1–41.3, 336, 455/347
See application file for complete search history.

(56) References Cited

U.S. PATENT DOCUMENTS

| 5,657,320 | A   | * | 8/1997 | Russ et al. ................. 370/217 |
| 6,028,853 | A   | * | 2/2000 | Haartsen ................... 370/338 |
| 2002/0003848 | A1 | * | 1/2002 | Wendorff .................. 375/356 |
| 2002/0126692 | A1 | * | 9/2002 | Haartsen ................... 370/458 |
| 2003/0181213 | A1 | * | 9/2003 | Sugar et al. ............... 455/454 |
| 2004/0008641 | A1 | * | 1/2004 | Sugaya et al. ............. 370/321 |

FOREIGN PATENT DOCUMENTS

| JP | 2003-143644 | 5/2003  |
| JP | 2003-229869 | 8/2003  |
| JP | 2003-258812 | 9/2003  |
| JP | 2003-309572 | 10/2003 |

OTHER PUBLICATIONS

U.S. Appl. No. 12/723,249, filed Mar. 12, 2010, Sugaya.

* cited by examiner

*Primary Examiner* — Lester Kincaid
*Assistant Examiner* — Daniel Lai
(74) *Attorney, Agent, or Firm* — Oblon, Spivak, McClelland, Maier & Neustadt, L.L.P.

(57) ABSTRACT

A wireless communication system in which each of communication stations performs networking operation in an autonomous, distributed manner, wherein each of the communication stations gathers information indicative of a band use situation in peripheral stations, grasps bands usable and unusable by the own station from the gathered information to set a band to be actually used by the own station, and mutually recognize bands to be used and unusable by the own station by informing to the peripheral stations.

26 Claims, 16 Drawing Sheets

FIG. 5

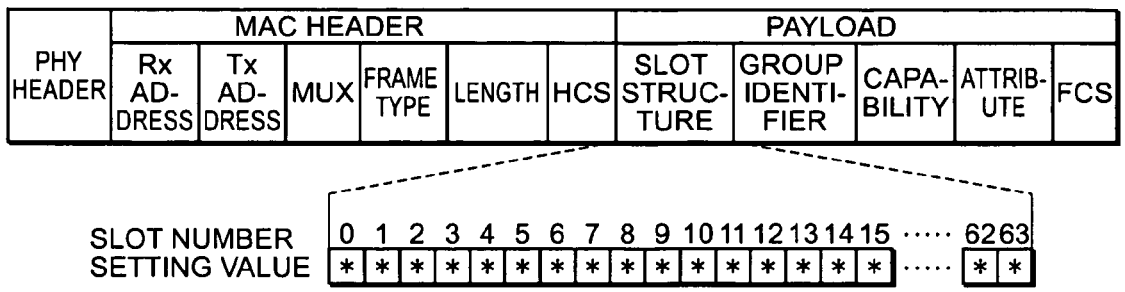

FIG. 6

| STATUS VALUE | ABBRE-VIATION | TITLE | SETTING CONDITION | SETTING VALUE | LIMITATIONS ON ADJACENT STATION |
|---|---|---|---|---|---|
| 8 | TBS | TRANSMIT BEACON SLOT | BEACON TRANSMISSION SLOT | 7(6) | TRANSMISSION PROHIBITED UNTIL PREDETERMINED TIME ELAPSES |
| 7 | RBS | RECEIVE BEACON SLOT | RECEIVING BEACON SLOT | 3(0) | TRANSMISSION PROHIBITED UNTIL PREDETERMINED TIME ELAPSES |
| 6 | NBS | NOT RECEIVE BEACON SLOT | NON-RECEIVING BEACON SLOT | KEEP | TRANSMISSION TO CORRESPONDING STATION PROHIBITED |
| 5 | SRS | STRONG RESERVE SLOT | RESERVED USE SLOT | 9 | TRANSMISSION PROHIBITED UNTIL OPEN SIGNAL IS RECEIVED |
| 9 | NSS | NEIGHBOR STRONG RESERVE | NEIGHBOR RESERVED USE SLOT | KEEP | TRANSMISSION PROHIBITED UNTIL OPEN SIGNAL IS RECEIVED |
| 4 | WRS | WEAK RESERVE SLOT | PRIORITIZED USE SLOT | 3 | TRANSMISSION PROHIBITED UNTIL PREDETERMINED TIME ELAPSES |
| 3 | NWS | NEIGHBOR WEAK RESERVE | NEIGHBOR PRIORITIZED USE SLOT | KEEP | TRANSMISSION PROHIBITED UNTIL PREDETERMINED TIME ELAPSES |
| 2 | TRS | TENTATIVE RESERVE SLOT | TENTATIVELY RESERVED SLOT | KEEP | CONFIRMATION OF RESERVATION IN CORRESPONDING SLOT PROHIBITED |
| 1 | LPS | LISTEN PERIOD SLOT | LISTENING SLOT | KEEP | NOT PARTICULARLY LIMITED |
| 0 | SPS | SLEEP PERIOD SLOT | SLEEPING SLOT | KEEP | TRANSMISSION TO CORRESPONDING STATION PROHIBITED |

FIG. 7

| PRIORITY ORDER | SETTING VALUE | PRIORITY SETTING CONDITIONS | MAJOR REASONS |
|---|---|---|---|
| 1 | 5 | SETTING OF STRONG RESERVE SLOT | SLOT POSITION CHANGE DURING MULTICAST IS COMPLICATED |
| 2 | 8 | SETTING OF TRANSMIT BEACON | OCCURS WHEN CROSSED WITH OTHER NETWORKS BUT NOT FREQUENT |
| 3 | 4 | SETTING OF WEAK RESERVE SLOT | SETTING CAN EASILY BE CHANGED BY SENDER COMMUNICATION STATION |
| 4 | 2 | SETTING OF TENTATIVE RESERVE SLOT | LOOSELY INTERPRETED AS NOT CONFIRMING RESERVE SLOT OF LOCAL STATION |
| 5 | 1 | SETTING OF LISTEN PERIOD SLOT | ARBITRARILY SETTABLE BY RECEPTION DESTINATION |

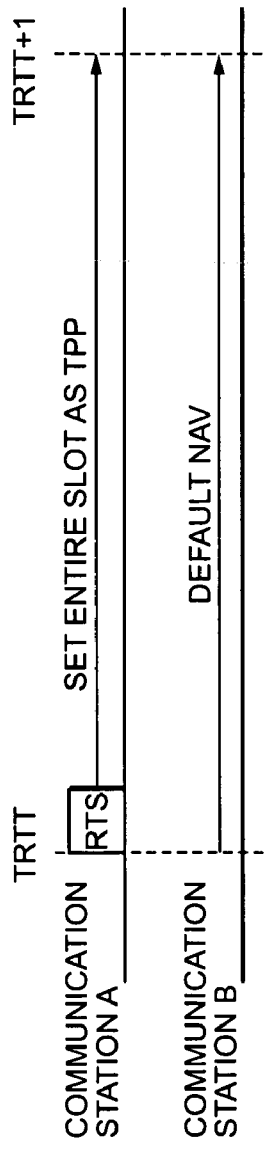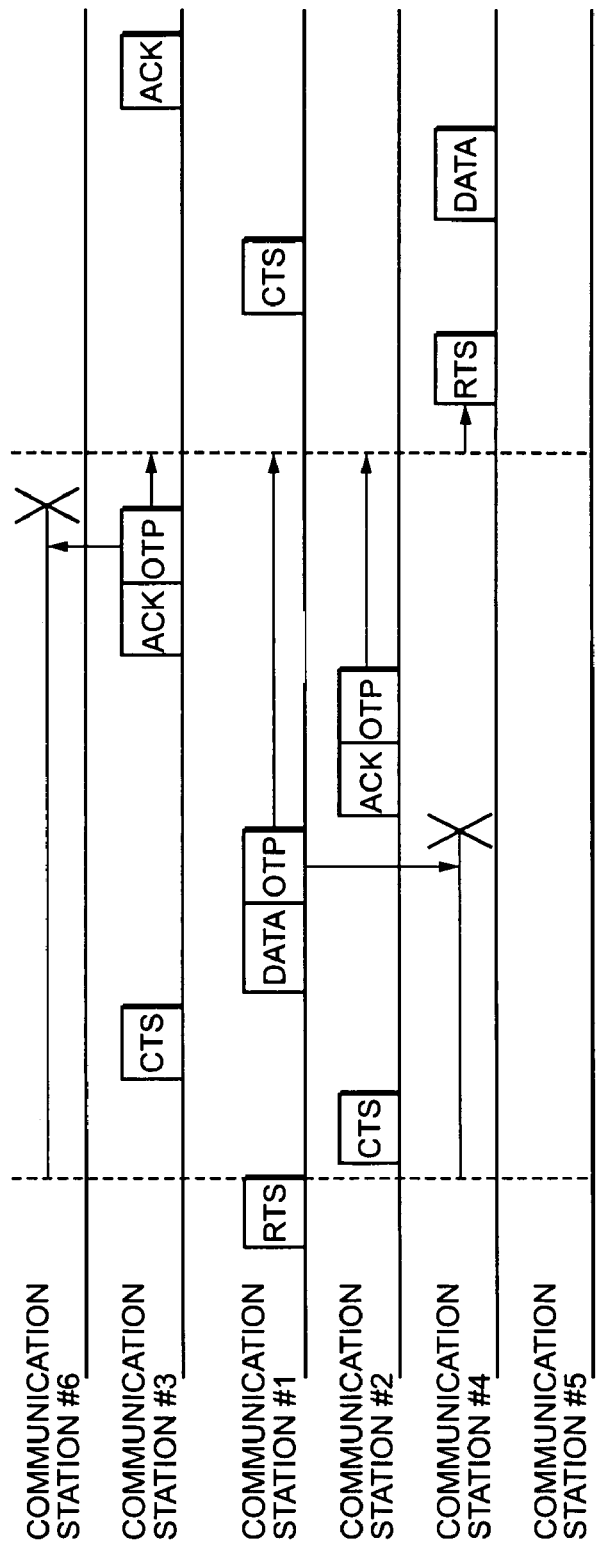
FIG. 9
FIG. 10

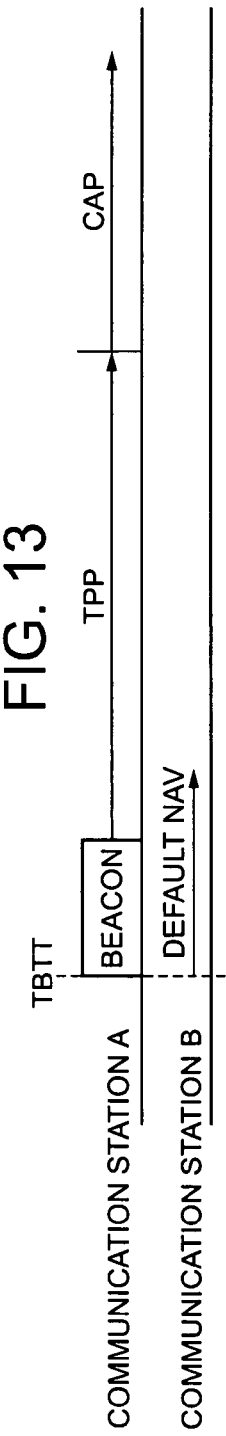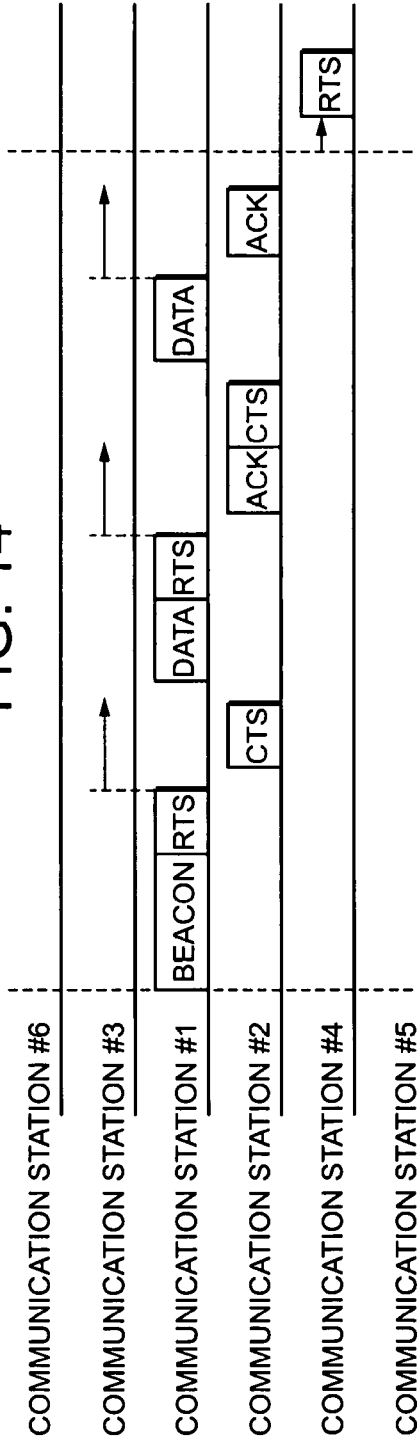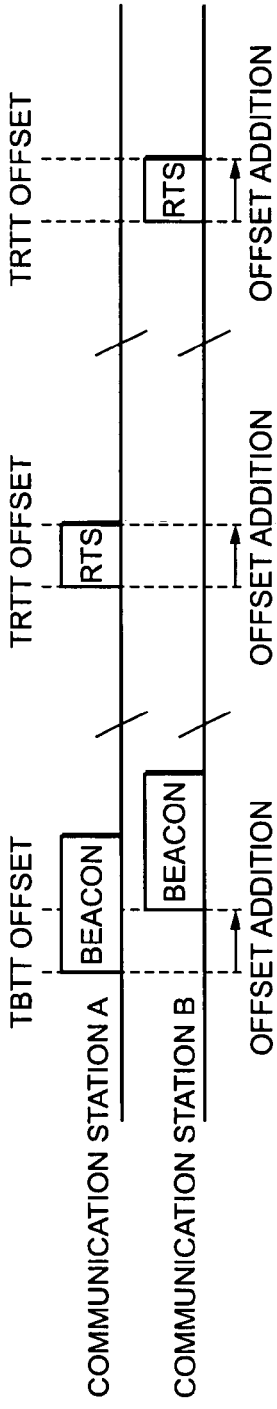

FIG. 24

| RECEPTION VALUE → SETTING VALUE ↓ | TBS | RBS | NBS | SRS | NSS | WRS | NWS | LPS | SPS |
|---|---|---|---|---|---|---|---|---|---|
| TBS | PRIORITY DETERMINATION | TBS | TBS | TBS MOVES | TBS | TBS | TBS | TBS | TBS |
| RBS | RBS | RBS | RBS | RBS | RBS | RBS | RBS | RBS | RBS |
| NBS | NBS | NBS | NBS | NBS | NBS | NBS | NBS | NBS | NBS |
| SRS | SRS | SRS | SRS | PRIORITY DETERMINATION | SRS | SRS | SRS | SRS | SRS |
| NSS | → RBS | NSS | NSS | NSS | NSS | NSS | NSS | NSS | NSS |
| WRS | → RBS | WRS MOVES | WRS | WRS MOVES | WRS MOVES | PRIORITY DETERMINATION | WRS | WRS | WRS |
| NWS | → RBS | NWS | NWS | → NSS | NWS | NWS | NWS | NWS | NWS |
| LPS | → RBS | → NWS | → NWS | → NSS | LPS | → NWS | LPS | LPS | LPS |
| SPS | → NBS | SPS | SPS | → NSS | SPS | SPS | SPS | SPS | SPS |

METHOD AND APPARATUS TO PERFORM SYNCHRONIZATION IN AN AD-HOC NETWORK

CROSS REFERENCE TO RELATED APPLICATION

This application claims priority from Japanese Priority Document No. 2004-060115, filed on Mar. 4, 2004 with the Japanese Patent Office, which document is hereby incorporated by reference.

BACKGROUND OF THE INVENTION

1. Field of the Invention

The present invention relates to a wireless communication system, a wireless communication apparatus and a wireless communication method, and a computer program by which a plurality of wireless stations intercommunicate with each other within a LAN such as a wireless LAN (Local Area Network). More particularly, the present invention relates to a wireless communication system, a wireless communication apparatus and a wireless communication method, and a computer program by which a wireless network is operated by each communication station communicating in an autonomous, distributed manner.

Further more particularly, the present invention relates to a wireless communication system, a wireless communication apparatus and a wireless communication method, and a computer program by which isochronous data such as AV content is transmitted efficiently under an autonomous, distributed wireless communication environment. Even more particularly, the invention relates to a wireless communication system, a wireless communication apparatus and a wireless communication method, and a computer program by which band-guaranteed data transmission is implemented under an autonomous, distributed wireless communication environment.

2. Description of Related Art

Among universal wireless network standards are IEEE (The Institute of Electrical and Electronics Engineers) 802.11 (e.g., see Non-Patent Document 1), HiperLAN/2 (e.g., see Non-Patent Document 2 or 3), IEEE 302.15.3, Bluetooth communication, and the like.

Generally, in order to construct a own area network using wireless technology, a method is employed by which an apparatus serving as a control station called an "access point" or a "coordinator" is provided within an area to form a network under an overall control by this control station.

In a wireless network having such access point, in a case where a communication apparatus transmits information, the following access control method is widely adopted. That is, the communication apparatus reserves a band necessary for its transmission at the access point so that the transmission does not collide with that of another communication apparatus. That is, by providing the access point, synchronous wireless communication is implemented in which communication apparatus within the wireless network synchronize with each other.

However, in a wireless communication system where an access point is present, in a case where asynchronous communication is to be implemented between a transmitting side and a receiving side, it is necessary to implement a wireless communication via the access point, and this imposes a problem that utilization efficiency of the transmission line is halved.

On the other hand, as another method of constructing a wireless network, "ad hoc communication" has been devised in which terminals directly intercommunicate to each other a synchronously. For a small-scale wireless network involving a relatively small number of adjacent clients, among others, ad hoc communication is considered appropriate in which arbitrary terminals can directly intercommunicate asynchronously without using a specific access point.

Since no central control station is present, an ad hoc wireless communication system is suitable for constructing, e.g., a home network composed of home appliances. The ad hoc network, as the routing is automatically changed in the event that one of the terminals breaks down or has its power turned off, is provided with features that the network is hard to fail, and that data can be transmitted to relatively remote locations at high data rates by causing packets to hop a plurality of times between mobile stations. Many examples of ad hoc networking developments are known (e.g., see Non-Patent Document 4).

For example, in an IEEE 802.11 wireless LAN system, networking under IEEE 802.11 is based on the concept of BSS (Basic Service Set). BSS includes two types, one of which is a BSS defined by an "infra mode" in which a master station such as an AP (Access Point, or control station) exists, and an IBSS (Independent BSS) defined by an "ad hoc mode" that is composed only of a plurality of mobile terminals (mobile stations). In the latter, ad hoc mode, terminals operate on a Peer-to-Peer basis in an autonomous, distributed manner without providing a control station. And when a beacon transmission time arrives, each terminal counts a random period, and unless it receives a beacon from any other terminal until the period expires, it transmits a beacon.

On the other hand, in order to transmit data having isochronism, and continuity in terms of time, such as AV content whose data needs to be sent periodically at fixed intervals, a band must be guaranteed. For example, the IEEE 802.11 TG-e is studying a communication method under the premise of band guaranteed communication using a wireless LAN.

However, in implementing band-guaranteed communication in a conventional wireless LAN system, it is commonplace to use a technique by which a specific control station is designated so that the control station manages communication resources on a centralized basis and thus assigns time for use that becomes available in a limited way within a particular group. Thus, the resulting configuration is such that the power of transmission is given to a communication apparatus serving as a sender of information on a centralized basis, and a wireless communication apparatus as a reception destination is controlled by the sender communication apparatus as being subject thereto.

In this case, this configuration is premised on the fact that a communication apparatus serving as a specific control station is designated, and thus it is not applicable to any system in which no control station apparatus is provided. Particularly, if an ad hoc network is formed without providing a specific control station to implement band-reserved communication, it is difficult to determine to what extent considerations should be given to its influence. Further, since the power of transmission is given to a communication apparatus serving as a sender of information on a centralized basis, a wireless communication apparatus serving as a reception destination cannot send a notice that it is using a band for receiving a signal at a predetermined timing.

Furthermore, in order to transmit data having isochronism, i.e., continuity in terms of time, isochronous communication is performed. In this case, a predetermined communication band (or time) for implementing isochronous communication is secured beforehand, and in the communication band (or time), communication is implemented exclusively between specific communication apparatuses.

For example, as technology of a wireless personal area network (WPAN) in IEEE 802.15.3 that is being under standardization at the time of filing this application, a predetermined communication band is secured as a guaranteed time slot (GTS) to implement isochronous communication within the band.

However, if it is intended to perform a band guaranteed communication such as an isochronous communication in a conventional wireless LAN system, a scheme must be used to share band-guaranteed traffic with other communication apparatus. Thus, a specific control station must be designated, and the control station apparatus must manage communication traffic on a centralized basis. In other words, in a wireless communication system in which a specific control station is not provided, such band-guaranteed communication cannot be applied directly.

Further, at a time of isochronous communication, communication between other communication apparatus must be eliminated, and thus, even in this sense, the control station must specify a communication apparatus that uses the time, on a centralized basis. That is, it is extremely difficult to realize band-reserving communication such as isochronous communication by forming an ad hoc network.

Furthermore, even if communication which is totally free from any interference at both ends of the network is established in by centralized management performed with a specific control station, if the control station allocates different bands for different communications, a problem arises therefrom that throughput is reduced.

Non-Patent Document 1: International Standard ISO/IEC 8802-11: 1999 (E) ANSI/IEEE Std 802.11, 1999 Edition, Part 11: Wireless LAN Medium Access Control (MAC) and Physical Layer (PHY) Specifications Non-Patent Document 2: ETSI Standard ETSI TS 101 761-1 V1.3.1 Broadband Wireless Access Networks (BRAN); HYPERLAN Type 2; Data Link Control (DLC) Layer; Part 1: Basic Data Transport Functions Non-Patent Document 3: ETSI TS 101 761-2V1.3.1 Broadband Wireless Access Networks (BRAN); HIPERLAN Type 2; Data Link Control (DLC) Layer; Part 2: Wireless Link Control (RLC) sublayer Non-Patent Document 4: C. K. Tho, "Ad Hoc Mobile Wireless Network" (published by Prentice Hall, PTR)

SUMMARY OF THE INVENTION

The present invention is to provide a wireless communication system, a wireless communication apparatus and a wireless communication method, and a computer program which are superior and by which a wireless network is suitably operated by communication stations performing autonomous, distributed communication operation.

Further, the present invention is to provide a wireless communication system, a wireless communication apparatus and a wireless communication method, and a computer program which are superior and by which isochronous data such as AV content can be transmitted efficiently under an autonomous, distributed wireless communication environment.

Still another, the present invention is to provide a wireless communication system, a wireless communication apparatus and a wireless communication method, and a computer program which are superior and by which each of communication stations secures a band for use by the own station and can thus transmit data reliably without interference from the other stations under an autonomous, distributed wireless communication environment.

The present invention has been made in consideration of the above problems, and a first aspect thereof is a wireless communication system in which communication stations perform networking operation in an autonomous, distributed manner without providing a specific control station. In the system, each of the communication stations gathers information indicative of a band use situation in peripheral stations, grasps bands usable and unusable by the own station from the gathered information to set a band to be actually used by the own station, and mutually recognize bands to be used and unusable by the own station by informing to the peripheral stations.

However, the term "system" herein used means a set of a plurality of logically grouped apparatus (or functional modules for realizing specific function(s)), and it does not matter whether or not the apparatus or functional modules are accommodated within a single housing.

In the wireless communication system according to the present invention, a coordinator is not particularly provided. By informing beacon information, each communication station informs the other adjacent communication stations of own presence and also reports a network configuration. Further, any communication station newly entering a communication range of a communication station senses its entrance into the communication range by, e.g., receiving a beacon signal, and can also be informed of a network configuration by decoding information described in the beacon.

In such a case, if there is no communication station around itself, the communication station can start transmitting a beacon at an appropriate timing. Thereafter, any communication station newly entering the communication range sets its beacon transmission timing so as not to interfere with the existing beacon assignment. At this point, since each communication station acquires a transmission prioritized period immediately after the beacon transmission, beacon assignment is sequentially determined according to an algorithm by which the beacon transmission timing of a newly entering station is set approximately in the middle of a beacon interval set by an existing communication station.

Here, in order to transfer data having isochronism, continuity in terms of time, such as AV content whose data needs to be sent periodically at fixed intervals, a band must be guaranteed. However, in order to guarantee a band in a conventional wireless LAN system, it is commonplace to use a technique by which a specific control station is designated so that the control station manages communication resources on a centralized basis. That is, when an autonomous, distributed network is formed to implement band-reserved communication, there is a problem that it is difficult to determine to what extent considerations should be given to its influence.

In contrast, according to the present invention, each communication station gathers information indicative of a band use situation in peripheral stations, grasps bands usable and unusable by the own station from the gathered information, sets a band to be actually used by the own station, and mutually recognizes the bands to be used and usable by the own station by informing to the peripheral stations, whereby a communication station can secure a band to be used by the own station, and thus can reliably transmit data without interference from other stations.

For example, each communication station describes a band use situation of the own station in a beacon signal, and transmits at every predetermined frame duration, whereby the communication station can inform band-reserved communication to an unspecified majority of communication stations adjacent thereto beforehand.

Therefore, the communication station grasps a reserved period by receiving a beacon signal in which the reserved period is set from a peripheral station, and further sets the reserved period as a period unusable for communication to itself, describes the presence of the unusable period in a beacon signal, and informs to further remote communication stations. That is, each communication station can inform a beacon signal which further includes information about its usable period based on the reservation situation in peripheral stations to further remote communication stations.

Meanwhile, a remote communication station is able to grasps an unusable period for transmission to the peripheral station by gathering a beacon signal from a peripheral station. As a result, in a reserved period to be used between a sender communication station and a reception destination communication station, there becomes no possibility of performing transmission by any other communication station, and stable communication can be implemented.

Thus, by establishing a communication process involving peripheral stations in addition to communication stations as a sender and a reception destination, band-reserved communication can be realized without providing a control station. Each communication station refrains itself from communication operation in a reserved period set by another communication station, whereby collisions and interference of communication can be avoided. That is, isochronous communication based on band reservation can be realized in an autonomous, distributed network, whereby a band can be guaranteed at the time of transmission of isochronous data such as AV content.

Here, a reserved period is a period set to limit use for specific communication, whereby the transmission path is exclusively used between specific communication apparatus. Thus, in a case of isochronous communication in which only a part of a predetermined communication band (time) once set is used, a remaining unused part cannot be used for communication between other communication apparatus, and thus a problem arises that throughput is reduced.

Thus, in the present invention, in addition to setting of a reserved period, a period (timing) an own station can use with priority can be set to implement isochronous communication in this transmission prioritized period as necessary. In a case where band-guaranteed isochronous communication is completed before the transmission prioritized period ends, i.e., the transmission prioritized time expires, it may be configured such that a method is also employed in which other stations implement arbitrary communication therein.

Alternatively, in a case where while a communication station is implementing communication by reserving a predetermined band, it becomes obvious that isochronous communication will be completed soon, the communication station informs the end timing by inclusion in data information to allow for arbitrary communication by any other station after the isochronous communication is actually completed. As a result, in a case of isochronous communication in which only a part of the transmission prioritized period is used, a remaining unused part of the period can be used by other communication stations, whereby throughput can be enhanced.

For example, in a case where communication is completed before a reserved band expires, it may be configured such that a communication station informs an open signal describing the end time to allow for use of the corresponding band after the end time elapses. When a communication station receives the above-mentioned open signal in an immediately preceding band, the communication station is allowed to use the corresponding band for communication other than band-reserved communication.

Furthermore, in the present invention, when a communication station sets a period for band-reserved communication, the communication station informs that it is operating a reservation to peripheral stations, and also transmits information indicative of a reservable period (time slot) to the peripheral stations. Therefore, reserving the same period (time slot) simultaneously between different neighboring stations can be prevented.

Each communication station explicitly indicates a reservable period (time slot) as tentatively reserved period information during its performing a reserving process, and informs to other surrounding communication stations by a beacon signal. Surrounding stations receiving the beacon signal can specify the reservable period (time slot), by the corresponding communication apparatus.

A communication station can set information that it will implement band-reserved communication, that it will receive beacon information from another station, that beacon information from another station is present, that it will transmit with priority, that it tentatively secures a period for reserved communication, that it will listen or the like in a band to be used by the own station, and informs the set information by describing it in a beacon signal to peripheral stations.

Furthermore, a communication station can set information that another station reserves a band, that it is sleeping, that it will implement reserved communication subject to an immediately preceding band or the like in a band unusable by the own station, and informs the set information by describing it in a beacon signal to peripheral stations.

Furthermore, a communication station sets a band reserved or prioritized by a peripheral station, or a band for receiving a beacon from a peripheral station as a band unusable by the own station.

Furthermore, a communication station can set a band for prioritized communication or a band for beacon reception, and when transmission is not implemented over a predetermined time in these bands, other communication stations are permitted to use for communication.

Furthermore, when a communication station transmits in a band set for reserved communication or prioritized communication, the communication station may start transmitting after an offset time set at a predetermined probability elapses.

Furthermore, a communication station refrains itself from making a reservation in a band tentatively secured by a peripheral station.

Further, a second aspect of the present invention is a computer program described in a computer-readable form for execution of control of a wireless communication operation for implementing data transmission under a wireless communication environment in which no specific control station is provided, over a computer system. The computer program is characterized by including a band usage information gathering step of gathering information indicative of a band use situation in a peripheral station, a usable band determining step of grasping bands unusable and usable by a own station from the above-mentioned information, a usable band setting step of setting a band to be actually used by the own station on the basis of a result of the above-mentioned determination, an unusable band setting step of setting a band unusable by the own station on the basis of the result of the above-mentioned determination, a communication control step of controlling communication operation on the basis of the above-mentioned usable and unusable bands set, and a band usage information informing step of informing information indicative of a use situation about the above-mentioned band set in the own station to the peripheral station.

The computer program according to the second aspect of the present invention defines a computer program described in a computer-readable form so as to realize predetermined processing on a computer system. In other words, the computer program according to the second aspect of the present invention is installed in the computer system, whereby cooperative actions are performed on the computer system to cause the computer system to operate as a wireless communication apparatus. By activating a plurality of such wireless communication apparatus to construct a wireless network, an advantageous effect can be obtained which is similar to the wireless communication system according to the first aspect of the present invention.

According to the present invention, a wireless communication system, a wireless communication apparatus and a wireless communication method, and a computer program can be provided which are superior and by which a communication station secures a band to be used by the own station and can thus transmit data reliably without interference from other communication stations under an autonomous, distributed wireless communication environment.

According to the present invention, band-reserved data transmission can be implemented under an ad hoc communication environment without interference from other communication stations. For example, real-time data such as AV content can be transmitted efficiently by isochronous communication.

Further, according to the present invention, each of wireless communication apparatus informs a timing it uses for band-reserved communication by beacon information, whereby the band-reserved communication can be realized without providing a control station. Each communication station informs the presence of band-reserved communication in a surrounding station to a further surrounding station, whereby it can inform the communication station so located as to be a hidden terminal with respect to the sender communication station of the presence of the communication beforehand. Furthermore, each communication station informs a timing a surrounding station uses for band-reserved communication by a beacon, whereby it can inform an unspecified majority of communication stations that they cannot transmit to itself using the timing beforehand.

In this way, a communication station informs a peripheral station of a timing at which it uses a band with priority, whereby communication using the band with priority can be guaranteed.

Furthermore, according to the present invention, each communication station informs the presence of a transmission prioritized period in a surrounding station to further remote surrounding stations, whereby it can inform the communication station so located as to be a hidden terminal with respect to the sender communication station of the presence of the communication effectively beforehand.

A communication station informs its beacon receiving timings, whereby it can inform wireless communication apparatus present around itself of a possibility that a beacon will be received and communication will thereafter be implemented in these bands.

Furthermore, according to the present invention, each communication station informs the presence of a beacon receiving period in a surrounding station to a further remote surrounding station, whereby it can inform the communication station so located as to be a hidden terminal with respect to the sender communication station of the presence of the communication effectively beforehand.

Furthermore, a communication station informs arbitrarily set receiving timings, whereby it can inform stations surrounding itself that they can transmit to itself in these bands.

Furthermore, according to the present invention, each communication station determines a band to be used for communication by avoiding beforehand a period in which reserved communication is implemented, on the basis of a slot use situation of communication apparatus around itself, whereby reserved communication can be implemented in an autonomous, distributed manner.

Furthermore, a communication station stores information that it can use a slot for transmission to a specific communication station, whereby it can transmit to the communication station in the slot.

Furthermore, Network Allocation Vector (NAV) is set in the entire part of a slot reserved by a peripheral station, whereby reserved communication can be implemented exclusively.

Furthermore, according to the present invention, a predetermined open signal is informed in a slot reserved by a peripheral station, whereby the end of the reserved communication can be indicated explicitly, whereby the slot can be thereafter used for other communication.

Furthermore, according to the present invention, a slot start timing is offset at a predetermined probability, whereby an access control method is obtained by which the presence of different communications in exactly the same slot can be discovered early.

Furthermore, according to the present invention, the clearance of NAV for successively reserved slots is defined, whereby even if communication in the reserved slots is short of an amount reserved, the reserved slots can be effectively re-used for other communication.

Other objects, features and advances of the present invention will become apparent from a more detailed description based on an embodiment of the present invention to be described later and the accompanying drawings.

BRIEF DESCRIPTION OF THE DRAWINGS

FIG. 5 is a diagram showing an example configuration of a beacon frame used in the autonomous, distributed network according to the present invention;

FIG. 6 is a diagram showing a list of types of slots described in a Slot Structure field of the beacon frame;

FIG. 7 is a diagram showing a priority order of status values to be set when a communication station uses slots;

FIG. 9 is a diagram showing an example operation in which a communication station sets Network Allocation Vector (NAV) in a reserved period of a neighboring station;

FIG. 10 is a diagram showing an example operation in which a communication station clears its NAV setting in a reserved period of a neighboring station;

FIG. 13 is a diagram showing an example operation in which a communication station sets its NAV in a beacon receiving period of a neighboring station;

FIG. 14 is a diagram showing an example operation in which a communication station clears its NAV setting in a beacon receiving period of a neighboring station;

FIG. 15 is a diagram showing an example offset setting to a beacon start timing and an example offset setting to a communication start timing in a reserved period or a transmission prioritized period;

FIG. 24 is a diagram showing a correspondence table between types of slots described in a Slot Structure field of a beacon and how the slots are set on the side of receiving stations.

DETAILED DESCRIPTION OF THE PREFERRED EMBODIMENTS

One embodiment of the present invention will hereinafter be described in detail.

A propagation path for communication considered in the present invention is of radio, via which a network is constructed among a plurality of communication stations. Further, in the following description, a configuration considered is that the communication stations use a single channel, but the configuration many be expanded to a case where a transmission medium composed of multiple channels, i.e., a plurality of frequency channels is used.

A wireless network system according to the present invention has an autonomous, distributed system configuration in which no specific control station is provided, in which transmission control is performed whereby channel resources are effectively utilized by a transmission (MAC) frame having a not strict time-division multiple access structure. Further, each communication station can directly transmit information asynchronously in accordance with an access procedure based on CSMA (Carrier Sense Multiple Access).

The following processing to be performed by each communication station is basically performed by all the communication stations participating in the network. However, there may be some cases where all the communication stations forming the network do not necessarily perform the following processing.

Figure 1:
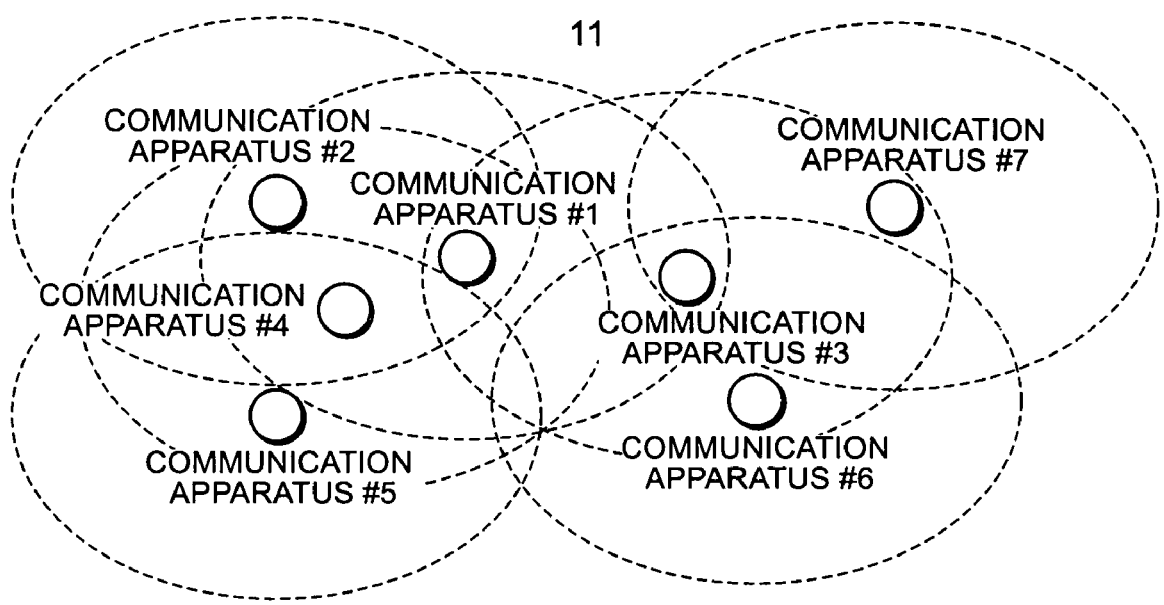
FIG. 1 is a diagram schematically showing a configuration of an autonomous, distributed network according to an embodiment of the present invention.

FIG. 1 schematically shows a configuration of an autonomous, distributed network according to an embodiment of the present invention. The network shown in the figure has a plurality of wireless communication apparatus, such as a communication apparatus #1 through a communication apparatus #7, located in a space, allowing for direct communication between adjacent communication apparatus.

Here, the communication apparatus #1 can communicate directly with the adjacent communication apparatus #2, #3, #4 that are within a radio wave accessible range 11 thereof (within an oval broken line with # 1 at the center), but cannot communicate directly with the other communication apparatus #5, #6, #7 that are beyond the range.

Further, the communication apparatus #2 can communicate directly with the adjacent communication apparatus #1, #4, but cannot communicate directly with the other communication apparatus #3, #5, #6, #7.

Furthermore, the communication apparatus #3 can communicate directly with the adjacent communication apparatus #1, #6, #7, but cannot communicate directly with the other communication apparatus #2, #4, #5.

Furthermore, the communication apparatus #4 can communicate directly with the adjacent communication apparatus #1, #2, #5, but cannot communicate directly with the other communication apparatus #3, #6, #7.

Furthermore, the communication apparatus #5 can communicate directly only with the adjacent communication apparatus #4, but cannot communicate directly with the other communication apparatus #1, #2, #3, #6, #7.

Furthermore, the communication apparatus #6 can communicate directly only with the adjacent communication apparatus #3, but cannot communicate directly with the other communication apparatus #1, #2, #4, #5, #7.

Furthermore, the communication apparatus #7 can communicate directly only with the adjacent communication apparatus #3, but cannot communicate directly with the other communication apparatus #1, #2, #4, #5, #6.

Thus, in an autonomous, distributed wireless communication system in which no control station is particularly provided, each of communication stations informs beacon information on the channel to inform other communication stations adjacent thereto (within its communication range) of its presence, and also of a network configuration. Since the communication station transmits a beacon at the beginning of a transmission frame duration, the transmission frame duration is defined by a beacon interval. Further, each transmission station scans the channel only for a period equivalent to the transmission frame duration to discover a beacon signal transmitted from a peripheral station, and decodes information described in the beacon to be informed of the network configuration.

Each communication station informs beacon information to inform other stations adjacent thereto (within its communication range) of its presence, and also of a network configuration. In the present specification, the beacon transmission cycle is defined as "superframe (T_SF)".

The communication stations moderately synchronize with each other while listening for beacons sent from peripheral stations. When a communication station newly appears, the new communication station sets its beacon transmission timing so as not to collide with beacon transmission timings of the existing communication stations.

Each communication station locates a beacon transmission timing of the own station at the beginning of a superframe. In other words, each communication station sets a superframe independently, such that its start timing does not overlap with those of superframes set by adjacent stations.

Figure 2:
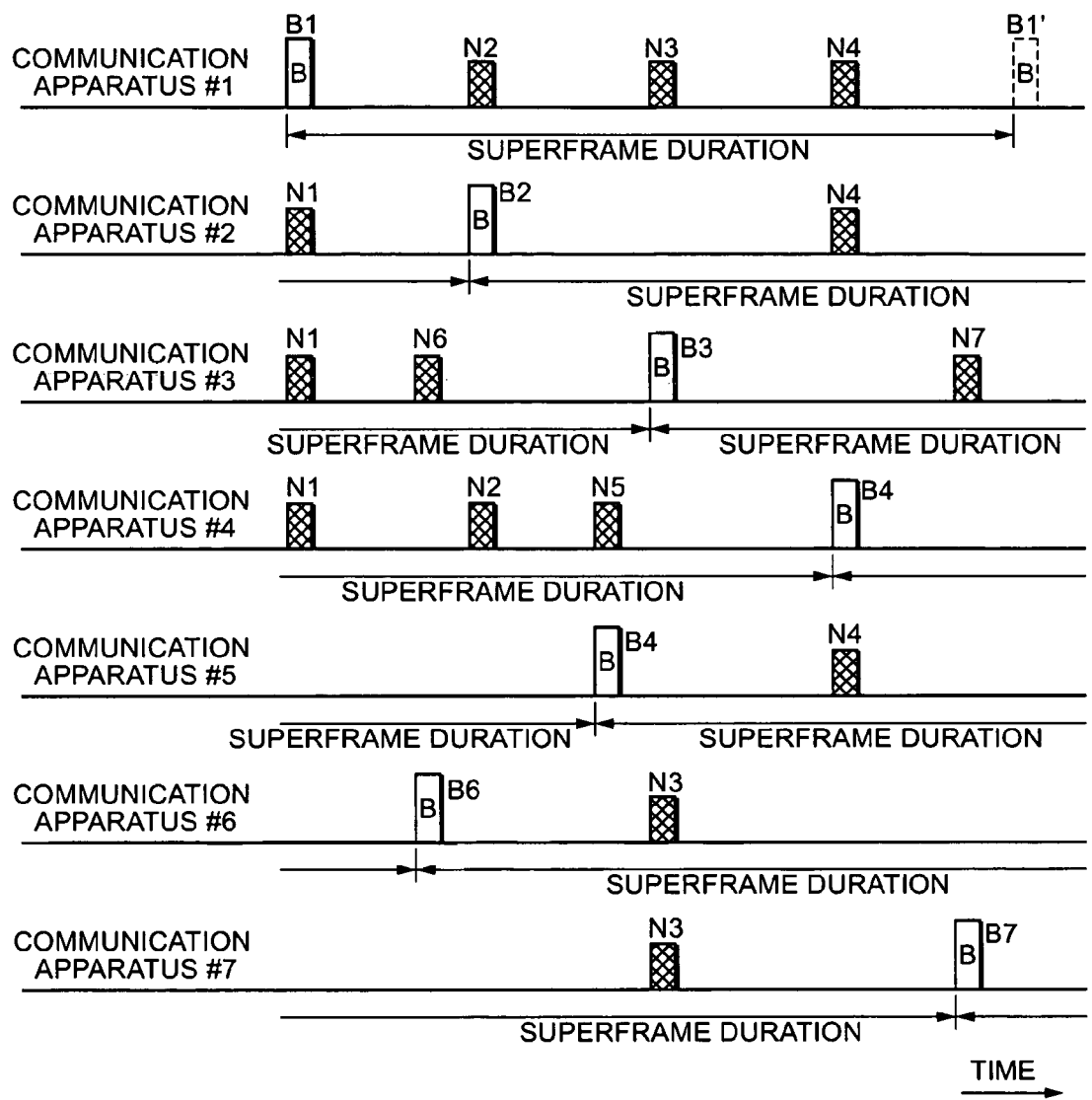
FIG. 2 is a diagram for explaining a procedure by which communication stations each transmit a beacon within their superframe.

A procedure will be described with reference to FIG. 2 by which the communication stations transmit beacons within their superframes in the autonomous, distributed network according to the present embodiment.

In an example shown in the figure, the wireless communication apparatus #1 receives beacon signals (N2, N3, N4) of the adjacent communication apparatus #2, #3, #4, and transmits its beacon signal (B1) at a timing not overlapping with those beacon signals, to set a period that lasts until a next beacon signal transmission timing (B1') as its superframe duration.

Further, the communication apparatus #2 can receive beacon signals (N1, N4) of the adjacent communication apparatus #1, #4; the communication apparatus #3 can receive beacon signals (N1, N6, N7) of its adjacent communication apparatus #1, #6, #7; the communication apparatus #4 can receive beacon signals (N1, N2, N5) of its adjacent communication apparatus #1, #2, #5; the communication apparatus #5 can receive a beacon signal (N4) of its adjacent communication apparatus #4; the communication apparatus #6 can receive a beacon signal (N3) of its adjacent communication apparatus #3; and the communication apparatus #7 can receive the beacon signal (N3) of its adjacent communication apparatus #3.

Thereafter, any communication station newly entering the communication range sets its beacon transmission timing so as not to collide with the existing beacon assignment.

Figure 3:
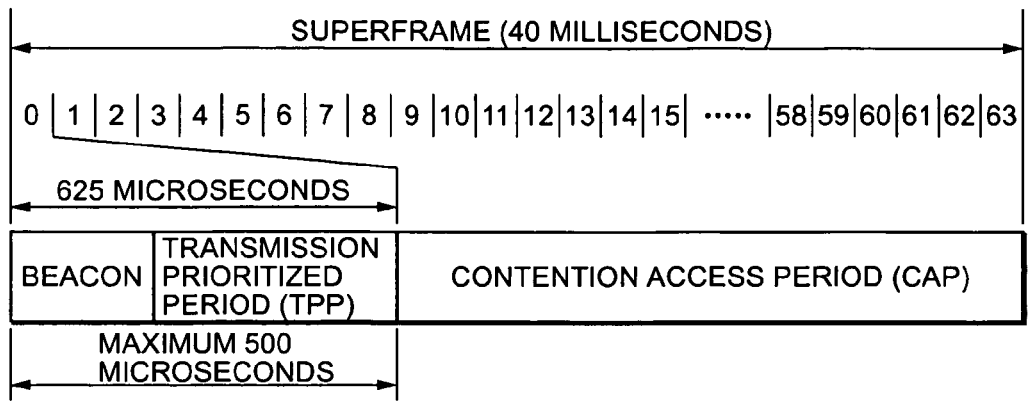
FIG. 3 is a diagram showing a configuration of the internal part of the superframe managed by a wireless communication apparatus.

FIG. 3 schematically shows an internal configuration of a superframe managed by each communication station. Each communication station defines its superframe by beacon transmission. How the superframe is used will hereinafter be described.

A superframe duration is defined by each communication station on the basis of its beacon transmission (Beacon), and is managed for each of relative beacon positions into which the beacon transmission is subdivided using the beacon transmission timing as a reference. In an example of the figure, a single superframe is divided into 64 equal parts, whereby a total of 64 relative beacon positions, i.e., slots 0 to 63 are provided.

Here, in an initial relative beacon position (position number 0), a Transmission Prioritized Period (TPP) thereof is set next to the beacon transmission.

In the transmission prioritized period TPP, the wireless communication apparatus becomes active to send or receive messages.

Further, positions (position numbers 1 to 63) other than the relative beacon position 0 are set as a Contention Access Period (CAP) for use between neighboring wireless communication apparatus as necessary, in a case where there is a demand for communication.

Furthermore, even set as a transmission prioritized period TPP, the period expires if a predetermined communication is completed or no communication is implemented, and is automatically used thereafter as a contention access period CAP between neighboring wireless communication apparatus as necessary.

Alternatively, it may be configured such that each communication station sets a part of the contention access period CAP as its transmission prioritized period TPP to use the part with priority for communication from a predetermined wireless communication apparatus.

In the present embodiment, each communication station handles a superframe in units of slots, and determines whether each of slots is a band usable or unusable by the own station on the basis of a band use situation of peripheral stations, after which it sets the slot as its usable band as necessary. This point will be described in detail later.

Figure 4:
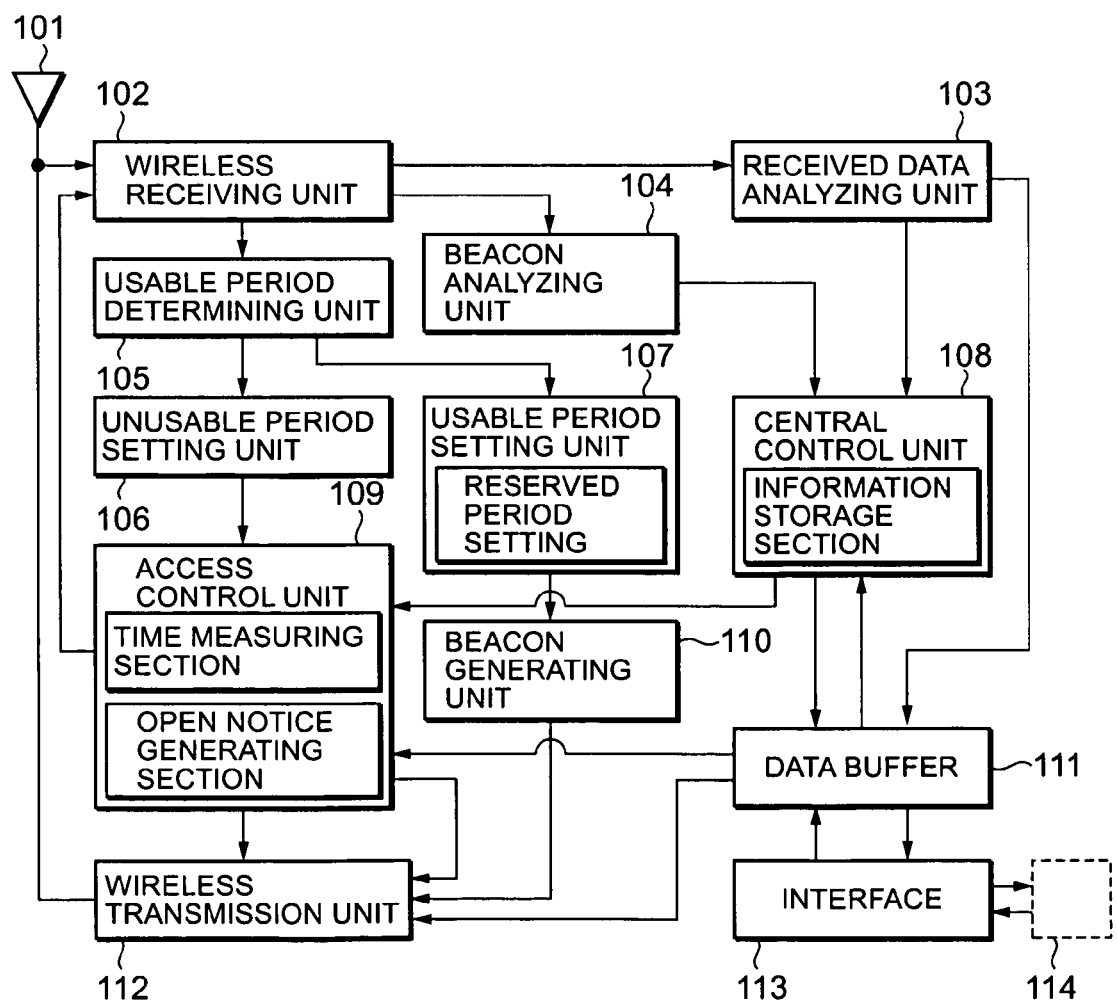
FIG. 4 is a diagram schematically showing a functional configuration of a wireless communication apparatus operating as a communication station in a wireless network according to an embodiment of the present invention.

FIG. 4 schematically shows a functional configuration of a wireless communication apparatus operating as a communication station in a wireless network according to an embodiment of the present invention. As shown in the figure, a wireless communication apparatus 100 includes an antenna 101, a wireless receiving unit 102, a received data analyzing unit 103, a beacon analyzing unit 104, a usable period determining unit 105, an unusable period setting unit 106, a usable period setting unit 107, a central control unit 108, an access control unit 109, a beacon generating unit 110, a data buffer 111, a wireless transmission unit 112, and an interface 113.

The antenna 101 transmits, by radio, signals to other wireless communication apparatus on a predetermined frequency channel, or gathers signals sent from other wireless communication apparatus. In the present embodiment, a single antenna is provided, thus not allowing both transmission and reception to be performed simultaneously.

The wireless transmission unit 112 includes a modulator that modulates a transmission signal in a predetermined modulation method such as OFDM (Orthogonal Frequency Division Multiplexing), a D/A converter that converts a digital transmission signal to an analog signal, an up-converter that up-converts an analog transmission signal by frequency conversion, a power amplifier (PA) that amplifiers the power of an up-converted transmission signal (none of which components are shown), and performs wireless transmission processing for packet signals at a predetermined transfer rate.

The wireless receiving unit 102 includes a low-noise amplifier (LNA) that amplifies the voltage of a signal received from another station via the antenna 101, a down-converter that down-converts a voltage-amplified received signal by frequency conversion, an automatic gain control (AGC), an A/D converter that converts an analog received signal to a digital signal, a synchronization process for synchronizing, channel assumption, and a demodulator that performs demodulating processing by a demodulation method such as OFDM (none of which components are shown).

The received signal analyzing unit 103 determines whether or not a signal contains data for processing from information extracted by the wireless receiving unit 102. For example, data information, and command information such as various reservation requests, confirmation notices, and reservation notices sent from peripheral stations are analyzed. Such command information is informed to the central control unit 108 to perform band reserving processing.

The beacon generating unit 110 generates a beacon signal which own station informs at every superframe. The beacon signal is transmitted at the beginning of the superframe. Further, the beacon analyzing unit 104 analyzes a beacon signal received from another station, and extracts information about the presence of an adjacent wireless communication apparatus and information about slots for use. In the present embodiment, a beacon signal contains information about bands usable and unusable within the superframe which are set by a communication station as a sender of the beacon. This point will be described in detail later.

The interface 113 exchanges various information with external equipment (e.g., a personal computer (not shown)) 114 connected to the wireless communication apparatus 100.

The data buffer 111 is used for temporary storage of data sent from the equipment connected via the interface 113 and data received via a wireless transmission path, before sending via the interface 113.

By analyzing beacon signals received from peripheral stations, the communication station can gather a band use situation around the own station to check and see which bands are usable and unusable by the own station. The usable period determining unit 105 determines whether or not the own station can use a slot from slot information extracted by the beacon analyzing unit 104.

The unusable period setting unit 106 sets information that a slot is unusable by the own station from the determination result of the usable period determining unit 105. Specifically, in a case where a neighboring station sets a reserved communication period, the unusable period setting unit 106 sets a condition that the reserved communication prevents itself from using the entire slot for its transmission. Further, in a case where a neighboring station has set a transmission prioritized period or beacon receiving, it sets a condition that it cannot communicate unless it follows a predetermined access control procedure, because it is highly likely that the neighboring station will use the slot.

The usable period setting unit 107 sets information that a slot is usable by itself from the determination result of the usable period determining unit 105. That is, the usable period setting unit 107 sets a condition that it can transmit to the neighboring station, in a case where the above-mentioned unusable period is not set or the reception is explicitly indicated.

The central control unit 108 performs management of a series of information transmission/reception processing and access control over a transmission path in the wireless communication apparatus 100 on a centralized basis. In the present embodiment, the central control unit 108 has an information storage section therein for accumulation of execution procedure instructions for a series of access control operation and the like executed by the central control unit 108, and addresses of adjacent stations from which beacons have been detected. Further, beacon transmission position (timing) information of adjacent stations, parameters (usable slot information, transmission prioritized period information) about reserved communication of adjacent stations described in their beacons, and the like are also stored in these information storage sections.

While a single superframe is composed of a plurality of slots (see FIG. 3), the central control unit 108 sets a slot it uses for reserved communication from a usable period set by the usable period setting unit 107, stores the setting condition in the access control unit 109, and also informs the setting condition to surrounding wireless communication apparatus as a beacon signal generated by the beacon generating unit 110.

The access control unit 109 has a time measuring section therein for control over transmission/reception timing of wireless signals. What is controlled includes, e.g., its packet transmission timing and RTS/CTS-based packet (RTS, CTS, data, ACK, and the like) transmission timing (setting of a frame interval IFS from its receiving the last packet to its sending a packet, reserved periods, back-off at the time of contention transmission), setting of NAV at the time of another station receiving a packet destined to such another station, and timing control of beacon transmission/reception and the like.

Further, the access control unit 109 determines whether or not the transmission path is usable on the basis of a predetermined access control procedure. And it has an open notice generating section therein, whereby, e.g., in a case where data for transmission has run out in its reserved period, the open notice generating section generates an open notice signal for clearing the setting of the subsequent unused part of its reserved period.

As already described, in the autonomous, distributed wireless communication system, each station informs beacon information on the channel to inform the other communication stations adjacent thereto (i.e., within its communication range) of its presence and also of a network configuration. FIG. 5 shows an example configuration of a beacon frame used in the autonomous, distributed network according to the present embodiment.

As shown in the figure, a beacon frame is roughly divided into three parts, a PHY header for identifying a signal frame, a MAC header in which address information and the like are described, and a beacon payload (Payload) including various parameter information as beacon information.

The PHY header includes a PHY header in which a predetermined PHY parameter is described. Further, the MAC header information includes fields such as a receiving station's address (Rx Address) in which a broadcast address is specified to identify a communication apparatus as a reception destination, a transmitting station's address (Tx Address) indicative of a MAC address serving as sender's address information, MUX representing the number of multiplexing of the MAC frame in the beacon frame, a Frame Type indicating that information transmitted is beacon information, a Length indicative of the information length of the beacon frame, a Header Check Sequence HCS for performing error detection of the MAC header.

Further, the beacon payload includes fields such as a Slot Structure for specifying a use situation of slots within its superframe, a Group Identifier set to identify a network group in which the beacon transmission station is included, capability information (Capability) indicative of the operating capacity of the beacon transmission station, attribute information (Attribute) indicative of information such as attributes of the beacon transmission station, and a Frame Check Sequence (FCS) for performing error detection of the entire beacon frame.

Here, in the Slot Structure field, how 64 slots assigned with its beacon position as a reference is used is described for each slot.

FIG. 6 shows a list of slot types described in the Slot Structure field of the beacon frame. Described hereinafter is an embodiment in which 10 types of slots 0 to 9 are prepared as the slot types. However, the gist of the present invention is not limited to this embodiment. Slots of intended uses other than those presented in the present specification and slots having more detailed intended uses may also be created as appropriate.

A status value 8 indicates that the slot is a slot (TBS) in which own station transmits a beacon. Any peripheral station sets the slot as a Receive Beacon slot (RBS), i.e., a setting value 7 in a case where the peripheral station receives the beacon, or as a beacon-present slot (NBS), i.e., a setting value 6 in a case where the peripheral station does not receive the beacon.

Note that in a case where the own station transmits in a slot to which the status value 8 is set by an adjacent station, it is desirable that the own station set a NAV initial value and refrain itself from transmission until a predetermined time elapses.

A status value 7 indicates that the slot is a slot (RBS) in which the own station receives a beacon. Any peripheral station that has received the beacon sets the slot as a Neighbor Weak Reserve slot (NWS), i.e., a setting value 3 in a case where the peripheral station receives in a band to which the status value 7 is set, i.e., a setting value 3, or sets the slot as a sleeping slot (SPS), i.e., a setting value 0 in a case where the peripheral station does not receive.

Note that in a case where the own station receives in a slot to which the status value 7 is set by an adjacent station, it is desirable that the own station set a NAV initial value and refrain itself from transmission until a predetermined time elapses.

A status value 6 indicates that the slot is a slot (BNS) in which the own station does not receive a beacon. Any peripheral station that has received the beacon does not need to change its slot usage in the slot (Keep).

Note that in a case where the own station transmits in a slot to which the status value 6 is set by an adjacent station, it is desirable that the own station refrain itself from transmission to the adjacent station.

A status value 5 indicates that the slot is a Strong Reserve slot (SRS) for reserved communication. Any peripheral station that has received the beacon is unable to use a band to which the status value 5 is set, and thus sets the slot as a Neighbor Strong Reserve slot (NSS), i.e., a setting value 9.

Note that it is desirable that the own station refrain itself from transmission in a slot to which the status value 5 is set by an adjacent station. In a case where the own station transmits, it must sense an open signal (to be described later) from the adjacent station that has make the reservation before it will transmit.

A status value 9 indicates that the slot is the Neighbor Strong Reserve slot (NSS) that is reserved by a neighboring station. Any peripheral station that has received the beacon does not need to change its slot usage in the slot (Keep).

Note that it is desirable that the own station refrain itself from transmission in a slot to which the status value 9 is set by an adjacent station. In a case where the own station transmits, it must sense an open signal (to be described later) from the adjacent station that has make the reservation before it will transmit.

A status value 4 indicates that the slot is a Weak Reserve slot (WRS) for prioritized communication. Any peripheral station that has received the beacon sets the slot as a Neighbor Weak Reserve slot (NWS), i.e., the setting value 3, because its use is limited in the slot.

Note that in a case where the own station transmits in a slot to which the status value 4 is set by an adjacent station, it is desirable that the own station set a NAV initial value and refrain itself from transmission until a predetermined time elapses.

A status value 3 indicates that the slot is the Neighbor Weak Reserve slot (NWS) used by an adjacent station with priority. Any peripheral station that has received the beacon does not need to change its slot usage in the slot (Keep).

Note that in a case where the own station transmits in a slot to which the status value 3 is set by an adjacent station, it is desirable that the own station refrain itself from transmission to the adjacent station.

A status value 2 indicates that the slot is a Tentative Reserve slot (TRS) in which the own station is likely to make a reservation. Any peripheral station that has received the beacon does not need to particularly change its slot usage in the slot (Keep), but must avoid newly reserving this slot with confirmation.

Note that in a case where the own station transmits in a slot to which the status value 2 is set by an adjacent station, it is desirable that the own station refrains itself from transmission to the adjacent station.

A status value 1 indicates that the slot is a Listen Period slot (LPS) in which the own station arbitrarily receives. Any peripheral station that has received the beacon does not need to particularly change its slot usage in the slot (Keep).

Note that the own station can use a slot to which the status value 1 is set by an adjacent station to transmit to the adjacent station.

The status value 0 indicates that the slot is the Sleep Period slot (SPS) in which the own station neither transmits nor receives. Any peripheral station that has received the beacon does not need to particularly change its slot usage in the slot.

Note that in a slot to which the status value 0 is set by an adjacent station, the own station is unable to transmit to the adjacent station.

Note that status values may be added to the above to allow for more detailed settings by which whether the Strong Reserve slot is a slot for transmission or a slot for reception can beset. Moreover, status values may further be added to specify, e.g., whether or not the Neighbor Strong Reserve slot is a slot for reception or a slot for transmission by a neighboring communication apparatus.

A correspondence table between types of slots described in the Slot Structure field of a beacon and how the slots are set/changed on the side of receiving stations is shown in FIG. 24 for reference.

FIG. 7 shows a priority order of status values to be set when a communication station uses slots. This is prepared to clarify which use is given a priority in a case where the communication station newly defines its slot usage (setting of reserved/transmission prioritized periods, and setting of beacon transmission).

Ranked first in the priority order is the setting of a Strong Reserve slot (setting value 5). The specific communication apparatus can use this slot with the highest priority unless contention occurs with a Strong Reserve slot of another communication apparatus. Note that in a case of newly setting a Strong Reserve slot, the specific communication apparatus must select one from its usable period.

Ranked second in the priority order is the setting of a Transmit Beacon slot (setting value 8). The specific communication apparatus must change its beacon transmission position only in a case where contention occurs with a Strong Reserve slot of another communication apparatus. Otherwise, the specific communication apparatus can use this slot with priority. Note that even if contention occurs with the Strong Reserve slot of another communication apparatus, the specific communication apparatus can keep its setting with priority over the Strong Reserve slot of another communication apparatus, unless it is able to re-set another slot.

Ranked third in the priority order is the setting of a Weak Reserve slot (setting value 4). The specific communication apparatus needs to change its transmission prioritized period in a case where contention occurs with a Strong Reserve slot or a Transmit Beacon slot of another communication apparatus. Note that in the case where contention occurs with the Strong Reserve slot of another communication apparatus, the specific communication apparatus may raise this slot in rank to a Strong Reserve slot unless it is able to re-set another slot.

Ranked fourth in the priority order is the setting of a Tentative Reserve slot (setting value 2). Even if contention occurs temporarily with a slot to be used by another communication apparatus, the specific communication apparatus does not need to particularly limit its use since the setting of this slot is automatically cleared some frames from the current frame. However, in a case where another irrelevant communication apparatus sets a Tentative Reserve slot for the specific communication apparatus during the specific communication apparatus performing a slot reserving operation, it is desirable that the specific communication apparatus suspends its reserving operation when it is determined less prioritized in a priority determination based on a predetermined parameter.

Ranked fifth in the priority order is the setting of a Listen Period slot (setting value 1). This slot is set arbitrarily by any communication apparatus, and thus in a case where contention occurs with a Strong Reserve/Weak Reserve slot or the like of another communication apparatus, the Strong Reserve/Weak Reserve slot or the like of another communication apparatus will prevail.

Figure 8:
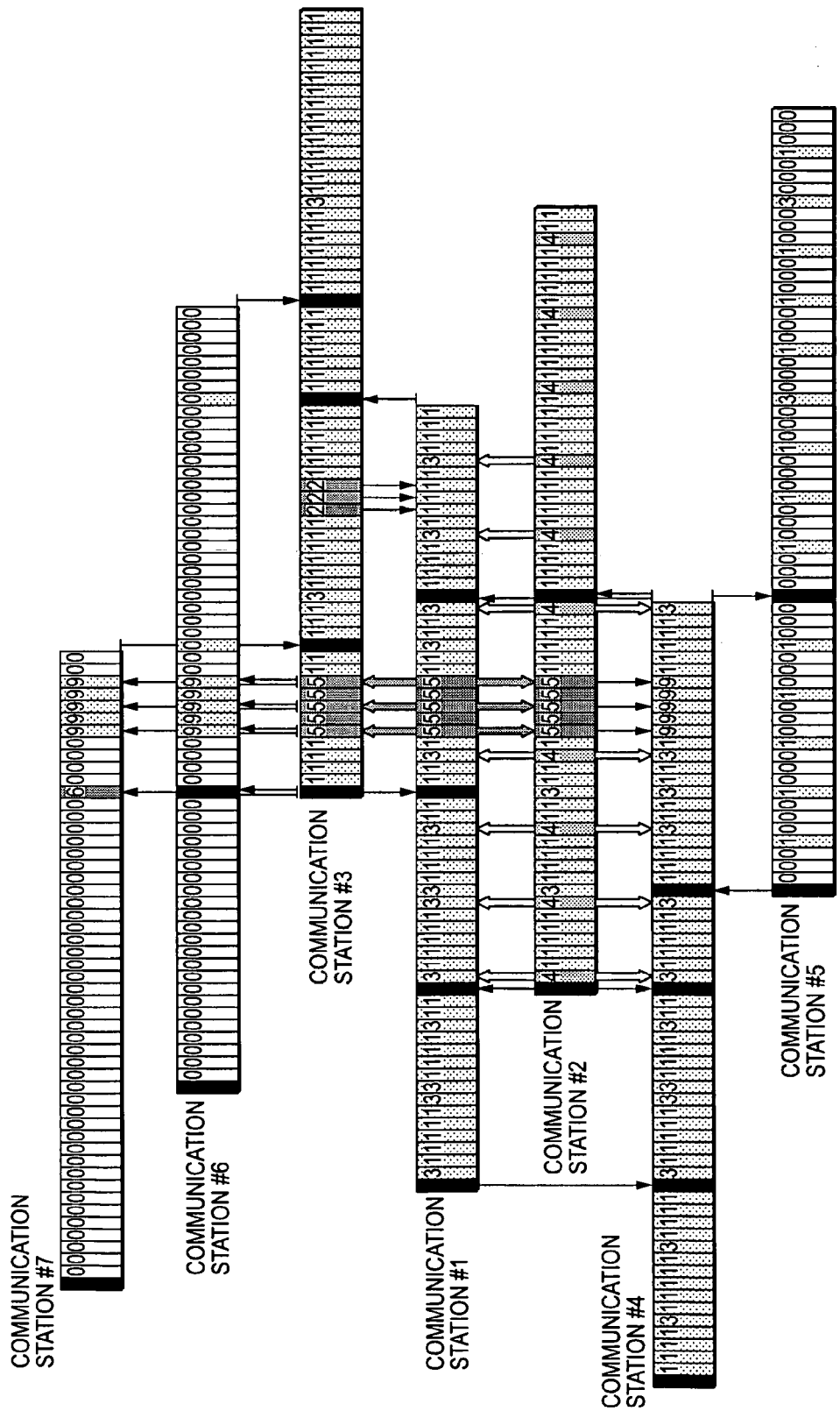
FIG. 8 is a diagram showing an example slot configuration of the internal part of superframes in a case where communication stations set reserved periods.

FIG. 8 shows an example configuration of slots within a superframe in a case where each of communication stations sets reserved periods such as mentioned above. Each communication station sets its reserved and prioritized periods, unusable and listening periods and the like while monitoring operation conditions of other communication apparatus around itself, for its communication. However, in the figure, the communication stations involved maintain the positional relationship shown in FIG. 1, and the slot position relationship is shown on the basis of each superframe configuration defined by a slot in which own station transmits its beacon (i.e., a slot to which the status value 8 is set).

As seen in the above-mentioned management procedure for the autonomous, distributed network, a slot in which a neighboring station's beacon is present is indicated as the status value 7 or 6. In the example shown in the figure, a specific communication station sets a slot as an unusable slot (i.e., the status value 3) in a case where an adjacent station sets the slot for beacon reception. However, if such setting is not needed, it may be configured such that the specific communication station does not set such setting.

A communication station #1 sets reserved communication periods, i.e., slots under the status value 5 within its superframe, in which it multicasts to neighboring communication stations #2 and #3. Further, the communication station #1, subject to the setting of transmission prioritized periods, i.e., the status value 4 set by the neighboring communication station #2, sets the status value 3 to the corresponding slots to make the slots unusable as neighbor transmission prioritized periods.

The communication station #2 sets the transmission prioritized periods, i.e., the slots under the status value 4, in which it communicates with the neighboring communication stations #1 and #4. Further, the communication station #2 also sets reserved communication periods, i.e., slots under the status value 5, so as to be a reception destination as requested by the neighboring communication station #1.

The communication station #3 sets tentatively reserved periods, i.e., slots under the status value 2, in which it tries to secure slots with the neighboring communication station #1. Further, the communication station #3 also sets reserved communication periods, i.e., the status value 5, so as to be a reception destination as requested by the neighboring communication station #1.

A communication station #4 sets, subject to the setting of the reserved communication periods, i.e., the status value 5 set by the neighboring communication station #2, sets the status value 9 to the corresponding slots to make the slots unusable as neighbor reserved periods. Further, the communication station #4 sets, subject to the setting of the transmission prioritized periods, i.e., the status value 4 set by the neighboring communication station #2, sets the status value 3 to the corresponding slots to make the slots unusable as neighbor transmission prioritized periods.

A communication station #5 sets slots under the status value 1, i.e., arbitrarily sets listening periods to intermittently listen for other stations. That is, the communication station #5 stays ready to communicate with the neighboring communication station #4 by using these listening periods. The communication station #5 sets the status value 0 to the rest of the slots, during which it stops operation to implement low power operation. Note that in a case where any of the arbitrary listening periods is set as Receive Beacon slot(s) under the status value 7 by the neighboring communication station #4, the communication station #5 may make the slot(s) unusable as neighbor transmission prioritized periods, i.e., under the status value 3.

A communication station #6 is in a condition in which it receives beacons only from a neighboring communication station, and it sets, subject to the setting of reserved communication periods, i.e., the status value 5 set by the neighboring communication station #3, the status value 9 to the corresponding slots to make the slots unusable as neighbor reserved periods. Further, the communication station #6 sets, subject to beacon transmission, i.e., the status value 8 set by the neighboring communication station #3, the status value 7 to the corresponding slots in a case where it receives beacons. Furthermore, the communication station #6 sets the status value 0 to slots other than those, as being unused, during which it stops operation to implement low power operation.

A communication station #7 is in a condition in which it is operating under a sleep mode, and sets, subject to beacon transmission, i.e., the status value 8 set by the neighboring communication station #3, the status value 6 to the corresponding slots, in which the presence of a beacon is set. Further, the communication station #7 sets the status value 0 to slots other than those, as being unused, during which it stops operation to implement low power operation.

FIG. 9 shows an example in which a communication station sets Network Allocation Vector (NAV), i.e., a transmission waiting period, in a reserved period of a neighboring station.

In the example shown in the figure, in a case where a Neighbor Strong Reserve slot is set, in order to protect reserved communication of a communication station A, a neighboring communication station B sets Network Allocation Vector (NAV) over the entire slot to refrain itself from transmission.

That is, a NAV initial value is set to a period from the start position (TRTT) of the slot to the start position (TRTT+1) of the next slot.

In general, a NAV setting period depends on a value described in the Duration field in the PHY header or the MAC header of an immediately preceding frame. However, in the example shown in the figure, the NAV is set over the entire slot, and thus its setting period is pre-defined. The NAV whose setting period is pre-defined is called default NAV in the present specification.

Even in a period in which a communication station sets default NAV to wait for transmission, the communication station can clear the NAV without waiting for the end of the slot by having a neighboring station set an open signal.

FIG. 10 shows an example operation in which a communication station clears its NAV setting in reserved periods of neighboring stations. In the figure, how a NAV setting is cleared in Neighbor Strong Reserve slots is indicated in a time-sequential manner.

A communication station #1 as a sender of a reserved communication, transmits an RTS frame, and communication stations #2 and #3 as reception destinations return CTS frames in reply thereto, respectively. Thereafter, the communication station #1 transmits data.

Here, in a case where the data transmission from the communication station #1 ends without consuming the entire band reserved, the communication station #1 sets an open notice (OTP) in which a time period that lasts until NAV is cleared is described. And the communication station #1 transmits the data frame with the OTP added thereto to peripheral stations.

Further, the communication stations #2 and #3 as the reception destinations of the data, respectively decrement the NAV clearance time period described in the open notices (OTP) received, and transmit ACK frames with decremented OTPs added thereto, to peripheral communication stations.

A communication station #4, to which the data is not destined, decodes the open notice (OTP) added to the data frame received from the communication station #1, and is thereby informed of a timing at which the NAV is cleared. Similarly, a communication station #6 decodes the open notice (OTP) added to the ACK frame received from the communication station #3, and is thereby informed of the timing at which the NAV is cleared.

Once the NAV is cleared, access is granted to all the communication stations. That is, any communication station that wishes to transmit can use the slot for arbitrary communication as long as it confirms that the medium stays cleared over a predetermined access control time and no other communication station transmits. In the example shown in the figure, after the NAV is cleared, data communication is implemented between the communication stations #1 and #4 during a remaining period of the slot.

The transmission path is exclusively occupied between specific communication stations in a reserved period. Thus, in a case of reserved communication in which only a part of a predetermined communication band once reserved is used, there arises a problem that throughput is reduced due to an unused part of the reserved band not being utilized between other communication stations. In contrast, in the above-mentioned example operation, NAV can be cleared by sending an OTP notice, allowing an unused part of a reserved slot to be used by other stations, whereby throughput can be enhanced.

Figure 11:
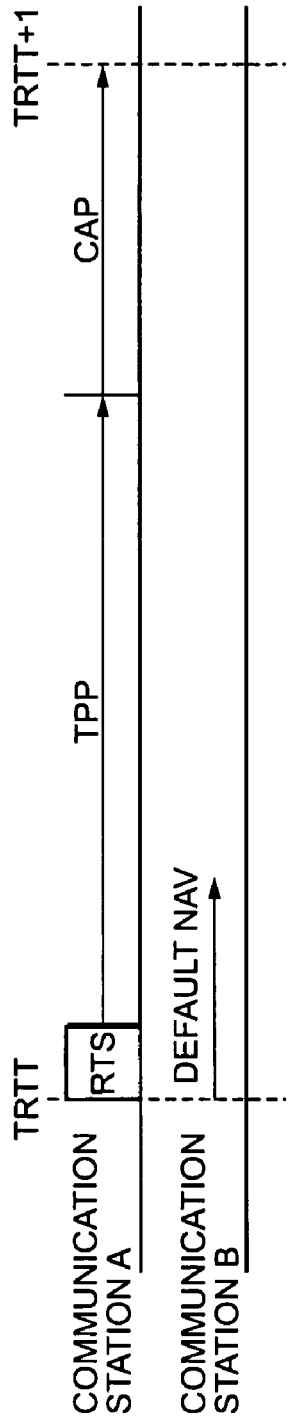
FIG. 11 is a diagram showing an example operation in which a communication station that sets NAV in a transmission prioritized period of an adjacent station.

Shown in FIG. 9 is how NAV is set in a reserved period of a neighboring station. The NAV is set in a transmission prioritized period of a neighboring station as well. FIG. 11 shows an example operation in which a communication station sets NAV in a transmission prioritized slot of a neighboring station.

In the example shown in the figure, in a case where a Neighbor Weak Reserve slot is set, in order to protect prioritized communication of a communication station A, a neighboring communication station B sets NAV until a predetermined time arrives, and refrains itself from transmission.

That is, a NAV initial value, i.e., default NAV is set to a period from the start position (TRTT) of the slot to a time at which use of the transmission path is determined by exchange of RTS and CTS frames.

However, unlike in a reserved period in which NAV is set over the entire slot, in a transmission prioritized period, NAV is set only for a limited time during which use of the transmission path is determined by exchange of RTS and CTS frames, meaning that its default NAV has a shorter interval.

And a predetermined time of the slot from the TRTT position (from a timing at which an RTS frame is sent) is set as a prioritized access period (TPP), but a period from the expiration of the TPP to the start position of the next slot (TRTT+1) is set as a contention access period (CAP). During the contention access period, access is granted to all the communication stations. That is, any communication station that wishes to transmit can use the slot for arbitrary communication as long as it confirms that the medium stays cleared over a predetermined access control time and no other communication station transmits.

Figure 12:
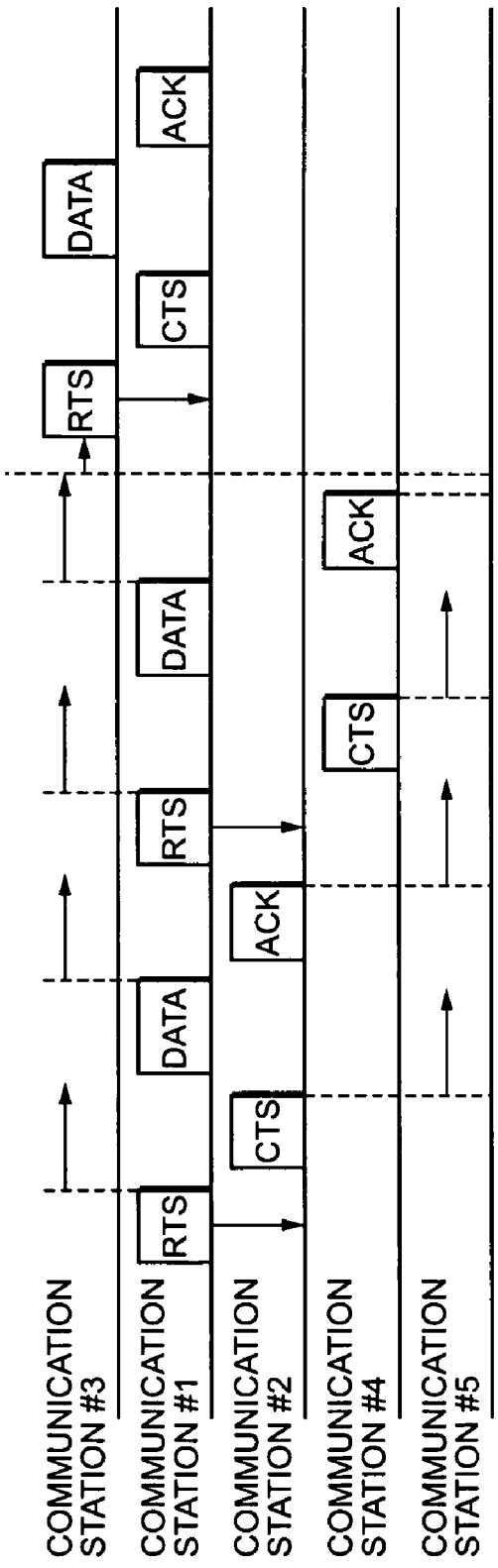
FIG. 12 is a diagram showing an example operation in which a communication station clears its NAV setting in a transmission prioritized period of a neighboring station.

FIG. 12 shows an example operation in which a communication station clears its NAV setting in a transmission prioritized period of a neighboring station. In the figure, how Network Allocation Vector (NAV) in a period in which a Neighbor Weak Reserve slot is set is shown in a time-sequential manner.

When receiving an RTS frame in a transmission prioritized period of a neighboring station, a communication station sets default NAV. Under the default NAV, a period from the start position (TRTT) of the slot to a time at which use of the transmission path is determined by exchange of RTS and CTS frames is set as a transmission waiting period. Thereafter, normal NAV is set, and thus the communication station waits for transmission for a period described in the Duration field of the PHY header or the MAC header of an immediately preceding frame.

In the example shown in FIG. 12, a communication station #1 as a sender of a prioritized communication, transmits an RTS frame, and a communication station #2 as a reception destination returns a CTS frame, whereby the communication station #1 transmits data, and the communication station #2 returns an ACK frame.

Further, the communication station #1 as the sender of a prioritized communication transmits an RTS frame, and a communication station #4 as a reception destination returns a CTS frame, whereby the communication station #1 transmits data, and the communication station #4 returns an ACK frame.

Here, neighboring communication stations #3 and #5 receive messages from the communication station #1, and consecutively update their normal NAV settings from duration information (Duration) described in the messages.

And once the NAV setting is cleared after the end of a last communication, any adjacent station can use the slot for arbitrary communication as long as no other communication station transmits for a predetermined access control time. In the example shown in FIG. 12, data communication is implemented between the communication stations #3 and #1 after it is confirmed that the medium stays cleared over a predetermined time.

FIG. 13 shows an example operation in which a communication station sets its NAV in a beacon receiving period of a neighboring station. In the example shown in the figure, in a case where beacon receiving is set, in order to protect beacon receiving communication of a communication station A, a neighboring communication station B sets NAV until a predetermined time, and refrains itself from transmission.

That is, a NAV initial value, i.e., default NAV is set during a period from the beacon transmission position (TBTT) of the slot to a time at which use of the transmission path is determined by exchange of RTS and CTS frames as a result of the beacon having been transmitted.

This means that in a case where a beacon is not received over the default NAV setting time, a signal may be transmitted according to a predetermined access control procedure after the time elapses.

Further, a predetermined time of the slot from the transmission of the beacon is set as a prioritized access period (TPP), and a period from the expiration of the TPP to the start position of the next slot (TRTT+1) is set as a contention access period (CAP). During the contention access period, access is granted to all the communication stations. That is, any communication station that wishes to transmit can use the slot for arbitrary communication as long as it confirms that the medium stays cleared over a predetermined access control time and no other communication station transmits.

FIG. 14 shows an example operation in which a communication station clears its NAV setting in a beacon receiving period of a neighboring station. In the example shown in the figure, how NAV is cleared in a Receive Beacon slot is shown in a time-sequential manner.

When an RTS frame is transmitted from a communication station #1 as a beacon sender, together with a beacon, a neighboring communication station #3 sets a NAV initial value for a period that expires when use of the transmission path is determined by exchange of a CTS frame.

And a communication station #2 as a reception destination returns the CTS frame, and the communication station #1 transmits an RTS frame together with data. Then, the communication station #2 returns another CTS frame together with an ACK frame. Thereafter, the communication station #1 transmits data, and the communication station #2 returns another ACK frame, whereby a successive RTS/CTS sequence is performed.

During such an operation period, neighboring communication stations #3 and #4 receive messages from the communication station #1 or #2, and consecutively update their normal NAV settings from duration information (Duration) described in the messages, respectively.

And once the NAV setting is cleared after the end of a last communication, any adjacent station can use the slot for arbitrary communication as long as no other communication station transmits over a predetermined access control time. In the example shown in FIG. 14, data communication is implemented between the communication stations #4 and #1 after it is conformed that the medium stays cleared for a predetermined time.

FIG. 15 shows an example in which how an offset is set at a beacon start timing (TBTT), and how an offset is set at a communication start timing (TRTT) in a reserved or transmission prioritized period.

The offset setting is prepared to allow one of stations to detect a slot collision by receipt of the other's communication even if both stations have started their transmission in the same slot at exactly the same time.

The offset setting is configured to be set at predetermined probabilities in a case of beacon transmission and in a case where reserved communication is started (an RTS frame is transmitted), respectively. For example, in the case of a beacon transmission, a probability of about 50% is set, whereas when reserved communication is started, a probability of about 20% is set. As long as at least one offset time is defined, collisions can be detected to some extent.

FIG. 15 shows separation of a beacon signal of a communication station A with no offset addition from a beacon signal of the communication station B with an offset addition, as well as an example in which offsets are set during reserved communication.

As already shown also in FIG. 8, a communication station can set reserved periods successively in idle slots. However, in a case where reserved communication is implemented only within a part of a predetermined communication bands once set, the communication station sends an OTP notice to clear its NAV, whereby other stations can use an unused part of the bands for their communication.

Figure 16:
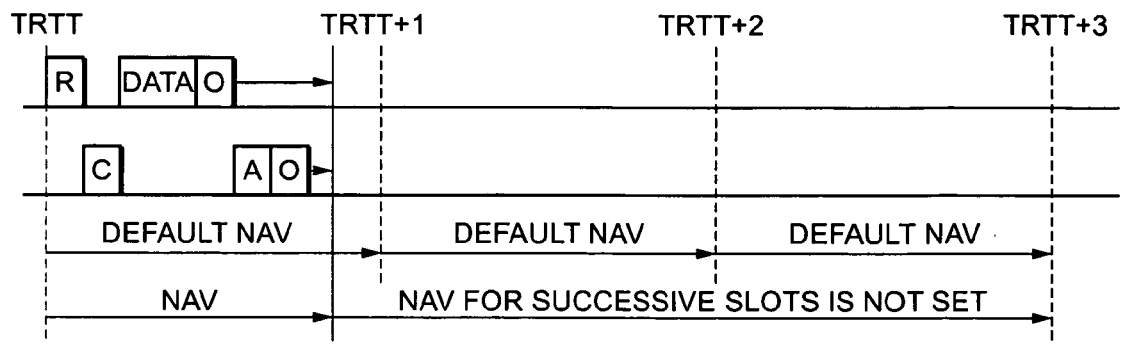
FIG. 16 is a diagram showing an example operation in which a communication station clears a NAV setting in successive Strong Reserve slots.

FIG. 16 shows an example operation in which a communication station clears a NAV setting in successive Strong Reserve slots.

In the example shown in the figure, it is indicated that when a data transmission is completed in a first one of a group of successive Strong Reserve slots, no data is transmitted in the subsequent slots, whereby these subsequent slots are usable for arbitrary communication by other communication stations. That is, it is indicated that any peripheral station receiving an open notice (OTP) in the first slot does not initialize NAV in the slots succeeding as from the open time.

Figure 17:
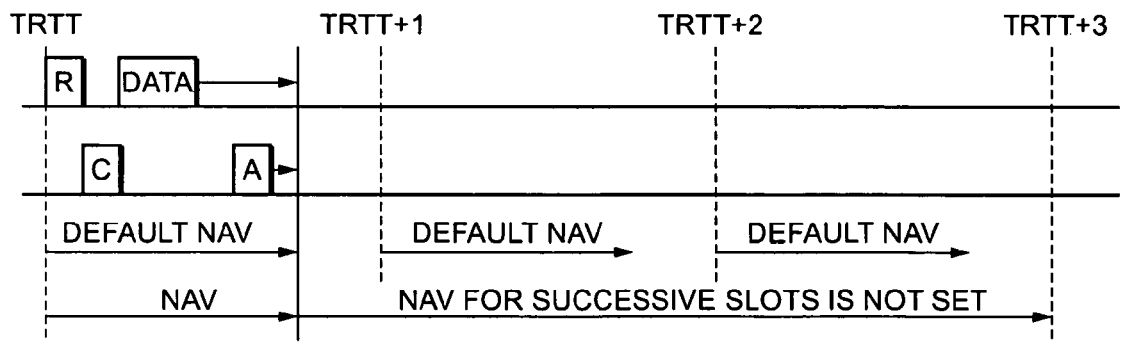
FIG. 17 is a diagram showing an example operation in which a communication station clears NAV settings in successive Strong Reserve slots.

FIG. 17 shows an example operation in which a communication station clears a NAV setting in successive Weak Reserve slots.

In the example shown in the figure, it is indicated that when a data transmission is completed in a first one of a group of successive Weak Reserve slots, no data is transmitted in the subsequent slots, whereby these subsequent slots are usable for arbitrary communication by other communication stations. That is, in a case where the communication apparatus does not transmit in the first slot for a predetermined time, any peripheral station does not initialize NAV in the slots succeeding as from the open time.

Figure 18:
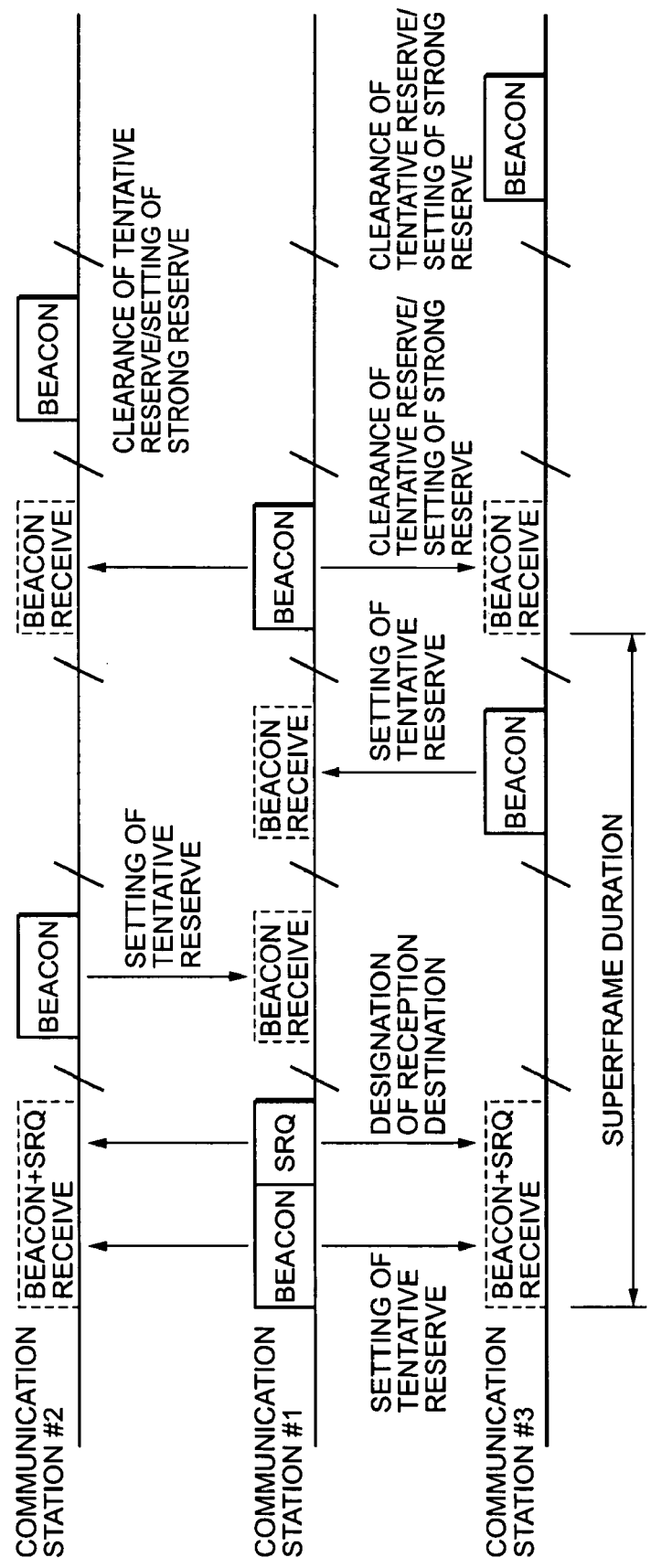
FIG. 18 is a diagram showing a sequence in which reserved information is exchanged in a case of setting a reserved use period.

FIG. 18 shows a sequence for exchanging reserved information in a case of setting a reserved use period.

In an example shown in the figure, a communication station #1 as a sender in reserved use transmits a request (SRQ) for reserving a predetermined slot to communication stations #2 and #3 serving as reception destinations, together with a beacon in which a tentatively reserved period is set for its communication.

When received the request for reserving a slot, the communication stations #2 and #3 determine a reservable period, respectively, and return their beacons in which the tentatively reserved period is set as their reply.

And the communication station #1 clears its setting of the tentatively reserved period and determines a reserved use period on the basis of the replied tentatively reserved period from the communication stations #2 and #3 as the reception destinations, and sets the reserved use period in its beacon.

Similarly, the communication stations #2 and #3 as the reception destinations clear their tentatively reserved period, and sets the Strong Reserve slot, respectively.

Figure 19:
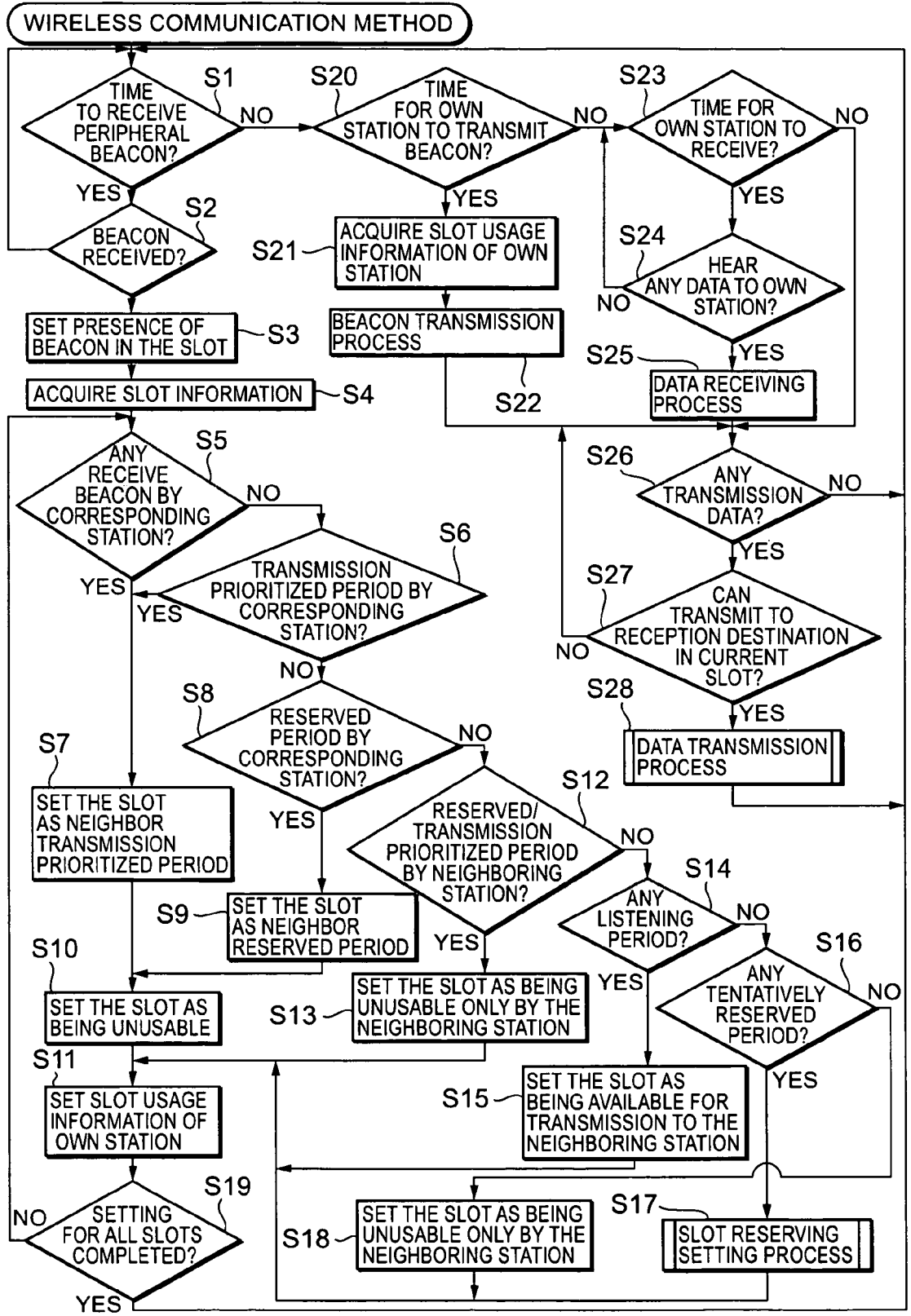
FIG. 19 is a flowchart showing an operation procedure by which a wireless communication apparatus 100 operates as a communication station in the autonomous, distributed network according to the present invention.

FIG. 19 shows an operation procedure by which the wireless communication apparatus 100 operates as a communication station in the autonomous, distributed network according to the present embodiment in the form of a flowchart. This operation procedure is actually realized in a mode in which the central control unit 108 executes a predetermined execution instruction program stored in its information storage section.

First, when it is a time to receive a beacon from a peripheral station in step S1, in a case where the beacon signal is received in step S2, the wireless communication apparatus 100 sets the corresponding timing in usable slot information managed by itself as the beacon being present in step S3, and also acquires slot information of the peripheral station that is sent by the beacon signal in step S4 to perform the following processing in accordance with what is set in the beacon signal.

In a slot set for receiving a beacon by a communication station as a beacon sender (a slot to which the status value 7 is set in the received beacon) in step S5, and in a slot set as a transmission prioritized period by a corresponding communication station (a slot to which the status value 4 is set) in step S6, the wireless communication apparatus 100 sets the status value 3 to the slots to set the slots as transmission prioritized periods by its neighboring stations in step S7, and also sets the slots as unusable periods for the own station in step S10, and thus sets the settings as its slot use situation in step S11.

Further, in a slot set for reserved communication by the communication station as the beacon sender (a slot to which the status value 5 is set in the received beacon) in step S8, the own station sets the status value 9 to the slot to set the slot as a reserved use period of its neighboring station in step S9, also sets the slot as an unusable period by the own station in step S10, and thus sets these settings as its slot use situation in step S11.

Furthermore, in a slot set for neighbor reserved communication or neighbor transmission prioritized communication by the communication station as the beacon sender (a slot to which the status value 3 or 9 is set in the received beacon) in step 12, the own station sets the slot as being unusable only for communication to the beacon sender, while keeping the status of the slot in step S13, and thus sets this setting as its slot use situation in step S11. Note that a slot set for neighbor reserved communication is unusable over the entire slot, whereas a slot set for neighbor transmission prioritized communication becomes unusable until a predetermined time.

Further, in a slot explicitly indicated as being a listening period by the communication station as the beacon sender (a slot to which the status value 1 is set in the received beacon) in step S14, the own station sets the slot as being usable for communication to the beacon sender, while keeping the status of the slot in step S15, and thus sets this setting as its slot use situation in step S11.

Furthermore, in a slot set as a Tentative Reserve slot by the communication station as the beacon sender (a slot to which the status value 2 is set in the received beacon) in step S16, the own station avoids setting the slot as a Strong Reserve slot, while keeping the status of the slot in step S17, and thus sets this setting as its slot use situation in step S11.

And if it is a slot that is not set for use by the communication station as the beacon sender, the own station sets the slot as being unusable only for communication to the beacon sender in step S18, and thus sets this setting as its slot usage in step S11. Note that in the example indicated here, slots that are not set for use are determined as being Sleep Period slots, but that such slots may be determined as Listen Period slots instead of Sleep Period slots.

After having performed its slot setting processing in accordance with the above-mentioned procedure in step S11, in a case where all the slots described in the beacon have been set in step S19, the own station returns to step S1 to repeat the beacon receiving process and the like again.

Meanwhile, if the setting of all the slots described in the beacon is not completed, the own station returns to step S5 to repeat the setting of a next slot.

On the other hand, in a case where it becomes a time to transmit its beacon in step S20, the own station acquires its slot use information set in step S11 in step S21, and transmits the beacon in which the information is described, in accordance with a predetermined procedure in step S22.

Thereafter, moving to step S26, the own station performs a process of resuming its data transmission.

Furthermore, in a case where it becomes a time for the own station to receive in step S23, when receiving information destined to itself in step S24, the own station receives data in step S25, but if not receiving, the own station returns to step S23 to repeat the listening operation over a predetermined time set as its listening period.

Furthermore, if transmission data is stored in the data buffer 111 in step S26, the own station determines whether or not it can transmit to a communication station as an information reception destination in the current slot in step S27. This is a case where the current slot is not set as being unusable for its transmission in the previous step S10, and if the slot is not set as being unusable for communication to the communication station as the information reception destination in step S13 or S18, the own station determines that it can transmit.

And if the own station can transmit, it transmits the data by radio in accordance with a predetermined access control procedure in step S28.

On the other hand, in a case where there is no data for transmission, the own station returns to step S1 to repeat the beacon receiving process and the like again.

In a case where the series of transmission processing is completed, the own station returns to step S1 to repeat the beacon receiving process and the like again.

Figure 20:
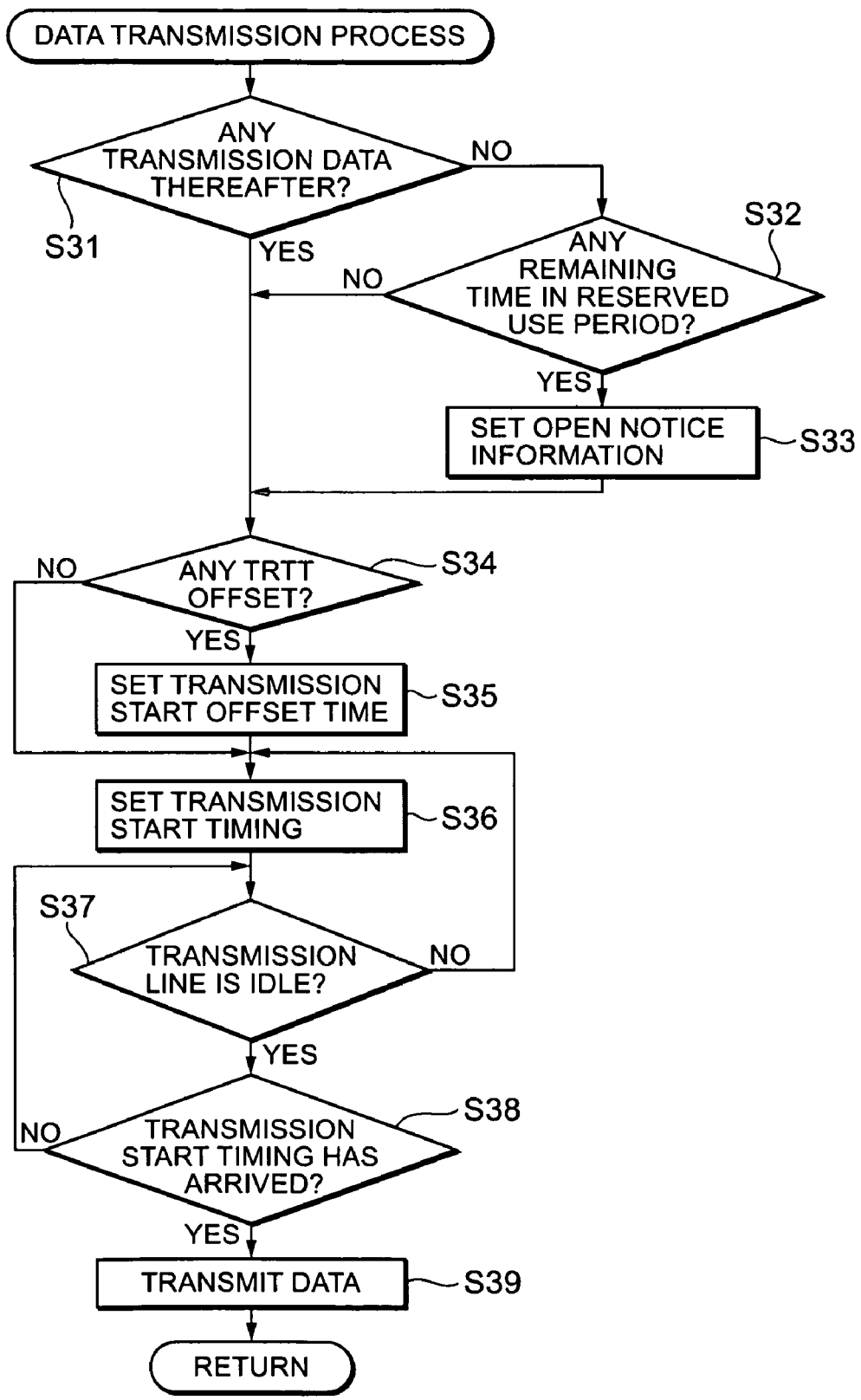
FIG. 20 is a flowchart showing an operation procedure by which the wireless communication apparatus 100 performs a data transmission process.

FIG. 20 shows an operation procedure by which the wireless communication apparatus 100 shown in FIG. 19 performs a data transmission process in the form of a flowchart. This operation procedure is actually realized in a mode in which the central control unit 108 executes a predetermined execution instruction program stored in its information storage section.

First, if there is no data for transmission thereafter in step S31, and if there is a remaining time in a reserved use period in step S32, the wireless communication apparatus 100 estimates a sequence end time until an ACK frame for the communication is replied, whereby it sets open notice information in step S32.

Thereafter, or under a condition other than those mentioned above, if a TRTT offset needs to be set in step S34, the wireless communication apparatus 100 sets a transmission start offset time in step S35, and sets a transmission start timing according to predetermined access control in step S36.

Further, if no other communication station transmits, and with the transmission path idle in step S37, in a case where the transmission start timing has arrived in step S38, the wireless communication apparatus 100 transmits data in step S39.

Thereafter, or under a condition other than those mentioned above, the series of the transmission process ends.

Figure 21:
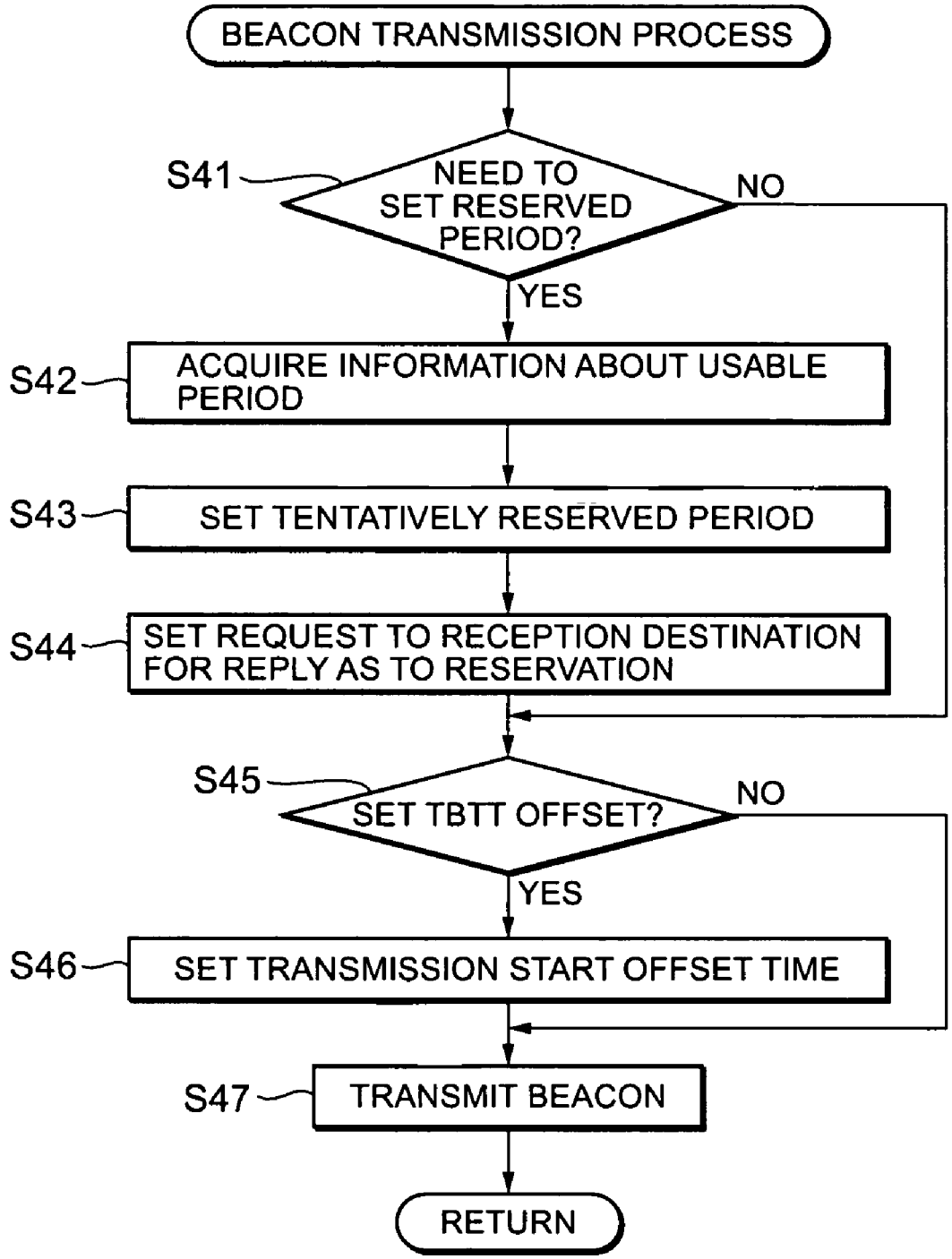
FIG. 21 is a flowchart showing an operation procedure of a subroutine by which the wireless communication apparatus 100 performs a beacon transmission process.

FIG. 21 shows an operation procedure of a subroutine by which the wireless communication apparatus 100 shown in FIG. 19 performs the beacon transmission process. This operation procedure is actually realized in a mode in which the central control unit 108 executes a predetermined execution instruction program stored in its information storage section.

First, if the wireless communication apparatus 100 needs to set its reserved period in step S41, it acquires both information about its usable period and information about a usable period of a communication station as a reception destination in step S42, sets a tentatively reserved period therefrom in step S43, and further sets a request (SRQ) for replying the tentatively reserved slot to the communication station as the reception destination in step S44.

Thereafter, or under a condition other than those mentioned above, if a TBTT offset needs to be set in step S45, the wireless communication apparatus 100 sets a transmission start offset time in step S46, thereafter transmits a beacon in step S47, and gets out of the series of processing.

Figure 22:
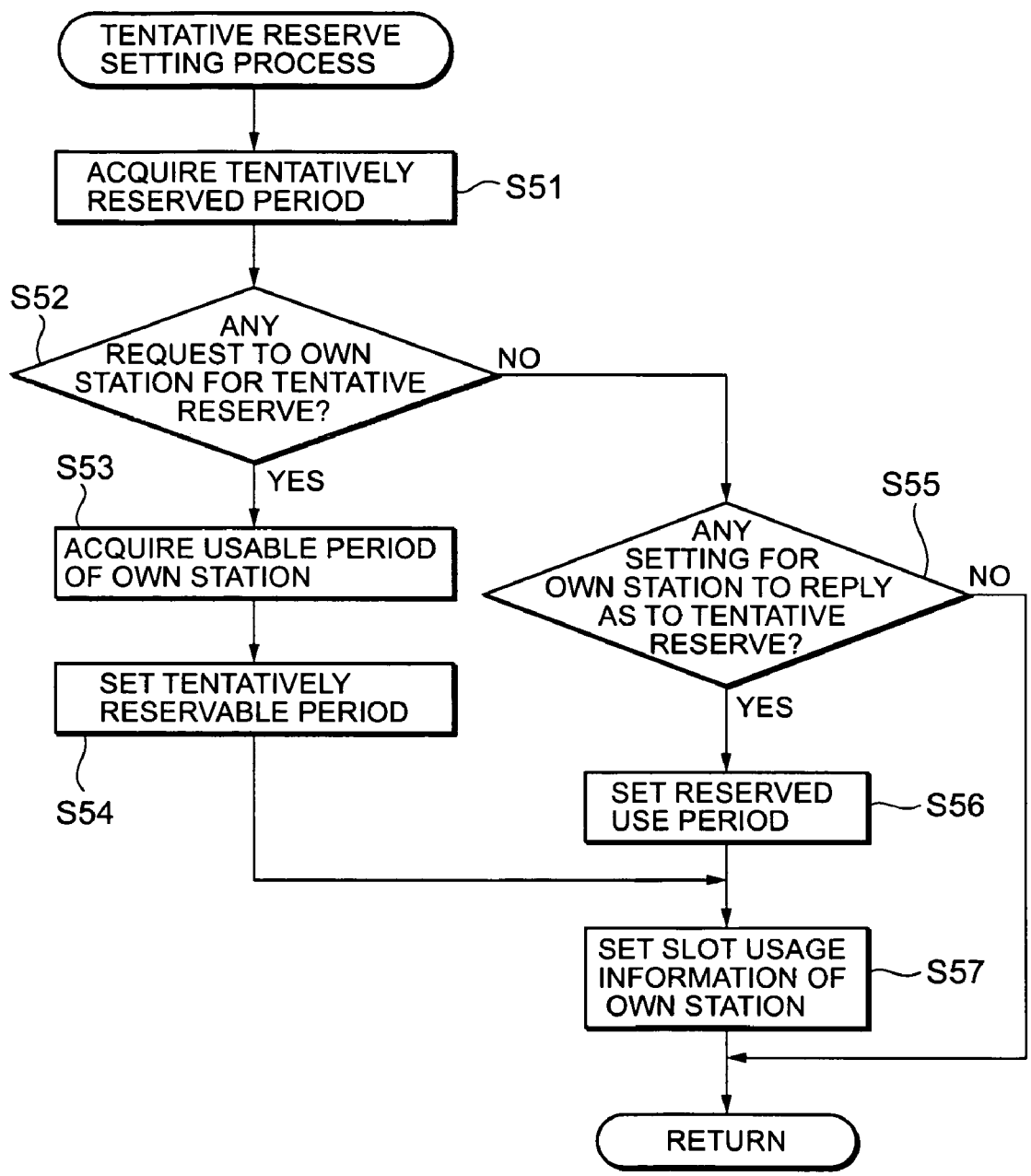
FIG. 22 is a flowchart showing an operation procedure of a subroutine by which the wireless communication apparatus 100 performs a tentative reservation setting process.

FIG. 22 shows an operation procedure of a subroutine by which the wireless communication apparatus 100 shown in FIG. 19 performs a tentative reservation setting process in the form of a flowchart. This operation procedure is actually realized in a mode in which the central control unit 108 executes a predetermined execution instruction program stored in its information storage section.

First, the wireless communication apparatus 100 acquires information about a tentatively reserved band in step S51, and determines whether or not the band is set as the tentatively reserved slot for itself on the basis of the setting of a request (SRQ) for replying a tentatively reserved slot sent together with a beacon in step S52.

Here, if requested to set a tentatively reserved slot, the wireless communication apparatus 100 acquires information about its usable period in step S53, and sets a reservable period in step S54. Thereafter, the wireless communication apparatus 100 sets the above setting as its usable slot information for transmission in a beacon in step S57, and gets out of the series of processing.

Further, if it is a reply in which a tentatively reserved slot is set for the own station in step S55, the own station determines its reserved use period, and sets a slot for reserved use in step S56.

Thereafter, the own station sets this setting as its usable slot information for transmission in a beacon in step S57, and gets out of the series of processing.

Figure 23:
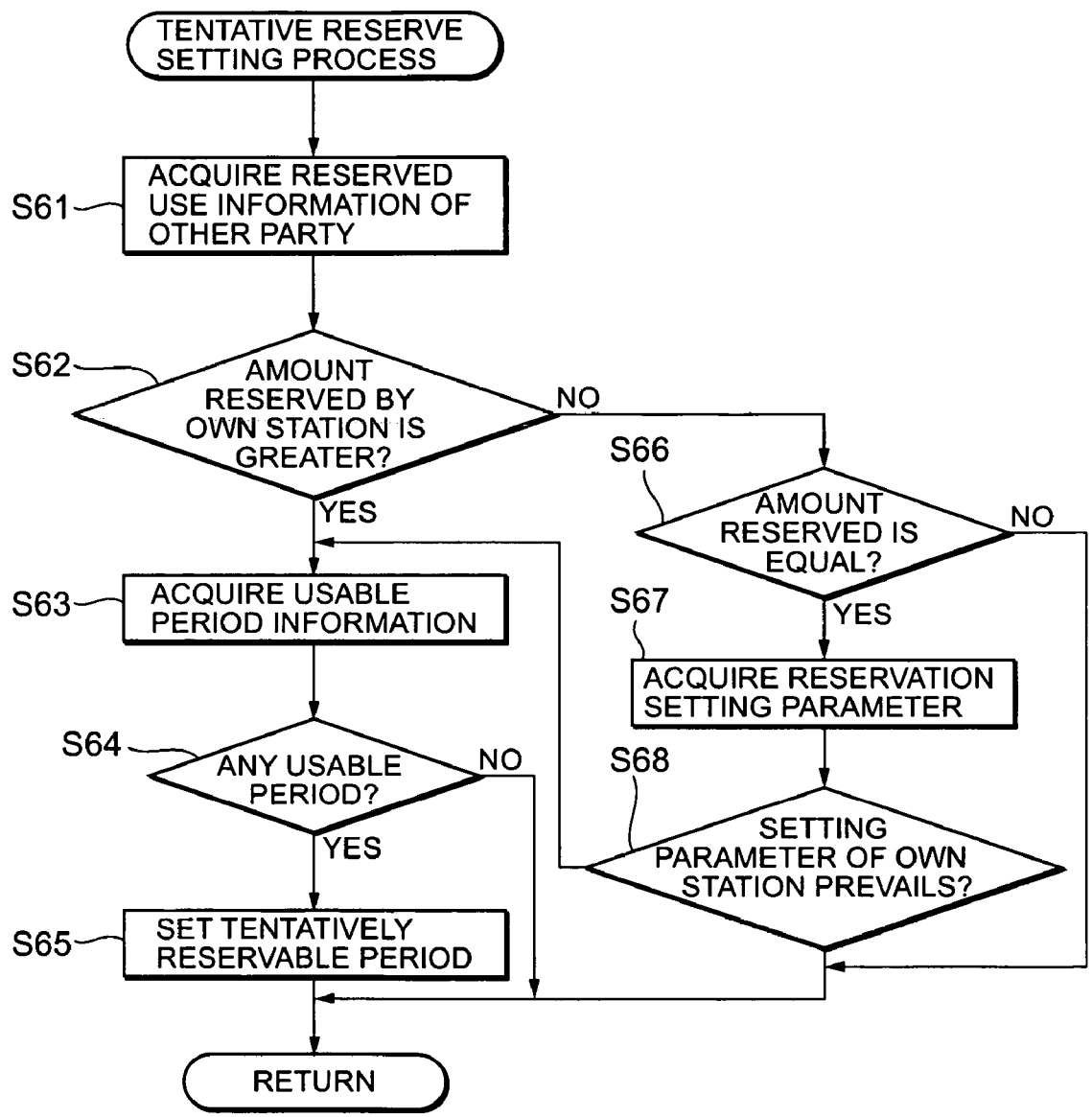
FIG. 23 is a flowchart showing an operation procedure of a priority determination process performed in a case where a reserved use period setting or the like is determined as overlapping with that of another station.

FIG. 23 shows an operation procedure according to which the wireless communication apparatus 100 shown in FIG. 19 performs a priority determination process in cases where its reserved use period or the like is determined as overlapping with that of another station, in the form of a flowchart. This operation procedure is actually realized in a mode in which the central control unit 108 executes a predetermined execution instruction program stored in its information storage section.

Here, first, the wireless communication apparatus 100 acquires reserved use information of a communication station serving as the other party in step S61, for comparison with an amount reserved by the own station in step S62.

Here, in a case where the amount reserved by the own station is greater, the own station acquires its usable period information in order to move an overlapping reserved period in step S63, and if there is a usable period therein in step S64, the own station re-sets the usable period in step S65, and gets out of the series of processing. Or, if there is no usable period for the re-setting at all, the own station may get out of the series of processing without further operation.

Further, if the amount reserved by the own station equals that of the other party in step S66, the own station acquires a reservation setting parameter in step S67, and unless its parameter prevails, the own station moves to step S63 to perform processing for moving the overlapping reserved period.

Furthermore, if the reserved amount by the own station is smaller and the parameter of the own station prevails, the own station keeps using the slot currently set as a reserved use period, and gets out of the series of processing.

The present invention is described in detail hereinabove with reference to a specific embodiment. However, it is self-explanatory that those skilled in the art could make modifications of or substitutions for the embodiment without departing from the scope and spirit of the present invention.

Further, while in the present specification, the description centered around the embodiment in which the present invention is applied to an autonomous, distributed wireless network, the present invention may, of course, be applicable similarly to networks other than the autonomous, distributed network.

Furthermore, to a multi-channel communication system in which communication stations intercommunicate while hopping from one of a plurality of frequency channels to another, the present invention may also be applicable to the system's media access control over each channel.

Furthermore, while in the present specification, the description is given of the embodiment of the present invention taking a wireless LAN as an example, the scope of the present invention is not limited thereto. The present invention can be suitably applied also to a communication method, such as an Ultra Wide Band, in which signals are transmitted/received under a lower SNR environment.

In summary, the present invention is disclosed by way of examples, and thus the description of the present specification should not be construed in a restrictive sense. In order to judge the scope of the present invention, claims set forth at the beginning of the specification should be taken into consideration.

What is claimed is:

1. A wireless communication system, comprising:
a plurality of communication stations configured to perform networking operation in an autonomous, distributed manner, each of the plurality of communication stations configured to gather information indicative of available communication slots with respect thereto, the available communication slots being portions of an ad-hoc managed bandwidth including communication slots available to others of the plurality of communication stations, the information indicative of available communication slots identifying a current reservation state of the available communication slots based upon a predetermined hierarchy, each station of the plurality of communication stations configured to inform others of the plurality of communication stations of current reservation states of available communication slots in accordance with the predetermined hierarchy as the information indicative of available communication, the plurality of communication stations configured to rank reservation states with the predetermined hierarchy which includes at least a reserved slot and a transmit beacon slot, each station of the plurality of communication stations configured to determine unusable slots based on the current reservations states of available communication slots of others of the plurality of communication stations and inform the others of the plurality of communication stations of the determined unusable slots, and each station of the plurality of communication stations is configured to transmit a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon.

2. A wireless communication system, comprising:
a plurality of communication stations configured to perform networking operation in an autonomous, distributed manner, each of the plurality of communication stations configured to gather information indicative of available communication slots with respect thereto, the available communication slots being portions of an ad-hoc managed bandwidth including communication slots available to others of the plurality of communication stations, the information indicative of available communication slots identifying a current reservation state of the available communication slots based upon a predetermined hierarchy and, configured to inform others of the plurality of communication stations of current reservation states of available communication slots in accordance with the predetermined hierarchy as the information indicative of available communication slots, the provision of beacon information describing information relating to a communication condition with respect thereto, and sets a communication slot which coincides with a beacon received from a peripheral station as an available slot unusable for communication in accordance with the predetermined hierarchy, the plurality of communication stations configured to rank reservation states with the predetermined hierarchy which includes at least a reserved slot and a transmit beacon slot, each station of the plurality of communication stations configured to determine unusable slots based on the current reservations states of available communication slots of others of the plurality of communication stations and inform the others of the plurality of communication stations of the determined unusable slots, and each station of the plurality of communication stations is configured to transmit a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon.

3. A wireless communication system, comprising:
a plurality of communication stations configured to perform networking operation in an autonomous, distributed manner, each of the plurality of communication stations configured to gather information indicative of available communication slots with respect thereto, the available communication slots being portions of an ad-hoc managed bandwidth including communication slots available to others of the plurality of communication stations, the information indicative of available communication slots identifying a current reservation state of the available communication slots based upon a predetermined hierarchy, and, configured to inform others of the plurality of communication stations of current reservation states of available communication slots in accordance with the predetermined hierarchy as the information indicative of available communication slots, the plurality of communication stations configured to rank reservation states with the predetermined hierarchy which includes at least a reserved slot and a transmit beacon slot, each station of the plurality of communication stations configured to determine unusable slots based on the current reservations states of available communication slots of others of the plurality of communication stations and inform the others of the plurality of communication stations of the determined unusable slots, and each station of the plurality of communication stations is configured to transmit a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon,
wherein when a communication slot is utilized to perform a band reserved communication or a prioritized communication, each of the plurality of communication stations begins transmission after an offset time elapses, the offset time being a predetermined probability.

4. A wireless communication system, comprising:
a plurality of communication stations configured to perform networking operation in an autonomous, distributed manner, each of the plurality of communication stations configured to gather information indicative of available communication slots with respect thereto, the available communication slots being portions of an ad-hoc managed bandwidth including communication slots available to others of the plurality of communication stations, the information indicative of available communication slots identifying a current reservation state of the available communication slots based upon a predetermined hierarchy and, configured to inform others of the plurality of communication stations of current reservation states of available communication slots in accordance with the predetermined hierarchy as the information indicative of available communication slots, for use in scheduling available time slots for use in communication, the plurality of communication stations configured to rank reservation states with the predetermined hierarchy which includes at least a reserved slot and a transmit beacon slot, each station of the plurality of communication stations configured to determine unusable slots based on the current reservations states of available communication slots of others of the plurality of communication stations and inform the others of the plurality of communication stations of the determined unusable slots, and each station of the plurality of communication stations is configured to transmit a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon,
wherein a respective one of the plurality of communication stations temporarily secures an available communication slot for performing band reserved communication, and does not temporarily secure communication slots identified as secured by a peripheral station in accordance with the hierarchy.

5. A wireless communication apparatus performing data transmission in a wireless communication environment, comprising:
a communication unit configured to transmit and/or receive wireless data on a communication channel;
an information gathering unit configured to gather information indicative of available communication channel slots with respect thereto, the available communication channel slots being portions of an ad-hoc managed bandwidth including communication slots available to others of a plurality of wireless communication apparatus, the information indicative of available communication slots identifying a current reservation state of the available communication slots based upon a predetermined hierarchy;
an identification unit configured to identify usable and unusable slots based upon the hierarchy, the identification unit configured to rank reservation states including at least a reserved slot and a transmit beacon slot with the predetermined hierarchy, the identification unit configured to determine unusable slots based on the current reservations states of available communication slots of others of the plurality of communication stations;
a setting unit configured to set available slots as usable and unusable by the wireless communication apparatus;
a controller configured to control communication operation based on the usable and unusable slots set; and an informing unit configured to inform others of the plurality of communication stations of current reservation states of available communication slots in accordance with the predetermined hierarchy as the information indicative of available communication slots and the determined unusable slots, the informing unit configured to transmit a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon.

6. The wireless communication apparatus according to claim 5, wherein the informing unit is configured to provide beacon signal information designating the available communication slots corresponding thereto in accordance with the predetermined hierarchy, periodically.

7. The wireless communication apparatus according to claim 5, wherein the informing unit is configured to describe information designating implementation of a band-reserved communication in the available communication slots in accordance with the predetermined hierarchy.

8. The wireless communication apparatus according to claim 5, wherein the informing unit is configured to describe information designating reception of beacon information from the others of a plurality of wireless communication apparatus of the available communication slots in accordance with the predetermined hierarchy.

9. The wireless communication apparatus according to claim 5, wherein the informing unit is configured to describe information designating existence of beacon information from the others of the wireless communication apparatus of the available communication slots in accordance with the predetermined hierarchy.

10. The wireless communication apparatus according to claim 5, wherein the informing unit is configured to describe information designating implementation of prioritized transmission of the available communication slots in accordance with the predetermined hierarchy.

11. The wireless communication apparatus according to claim 5, wherein the informing unit is configured to describe information designating temporarily secured slots of the available communication slots in accordance with the predetermined hierarchy.

12. The wireless communication apparatus according to claim 5, wherein the informing unit is configured to describe information designating performing receiving operation relative to the available communication slots in accordance with the predetermined hierarchy.

13. The wireless communication apparatus according to claim 5, wherein the informing unit is configured to describe information designating that the others of the plurality of wireless communication apparatus has reserved slots of the available communication slots in accordance with the predetermined hierarchy.

14. The wireless communication apparatus according to claim 5, wherein the informing unit is configured to describe information designating a sleeping mode in the unusable slots.

15. The wireless communication apparatus according to claim 5, wherein the informing unit is configured to describe information designating a band-reserved communication pursuant to an immediately preceding available slot in an available slot identified as unusable in accordance with the predetermined hierarchy.

16. The wireless communication apparatus according to claim 5, wherein the informing unit is configured to set a reserved or prioritized available slot of a peripheral station as unusable in accordance with the predetermined hierarchy.

17. The wireless communication apparatus according to claim 5, wherein the informing unit is configured to set an available slot for receiving a beacon from a peripheral station as a band unusable in accordance with the predetermined hierarchy.

18. The wireless communication apparatus according to claim 5, further comprising:
   a signal generating unit configured to generate an open signal describing a completion of slot utilization before a set and reserved slot scheduled as unusable expires.

19. The wireless communication apparatus according to claim 18, wherein the controller is configured to perform a predetermined access control after the completion when receiving the open signal from one of the others of the plurality of wireless communication apparatus.

20. The wireless communication apparatus according to claim 5, wherein the setting unit is configured to set a slot of the available slots for prioritized communication or a slot of the available slots for beacon reception; and when transmission is not performed in these slots for a predetermined time interval, the controller is configured to allow others of the plurality of wireless communication apparatus to utilize these slots.

21. The wireless communication apparatus according to claim 5, wherein when performing transmission in an available slot set to perform a reserved communication or a prioritised communication in accordance with the predetermined hierarchy, the controller is configured to start the transmission after an offset time elapses, the offset time being a predetermined probability.

22. The wireless communication apparatus according to claim 5, wherein the setting unit is configured to temporarily secure an available slot for performing reserved communication, and does not temporarily secure communication slots identified as secured by a peripheral station in accordance with the hierarchy.

23. The wireless communication apparatus according to claim 5, wherein the identifying unit is configured to rank a strong reserved slot as higher priority than a transmit beacon slot based on the predetermined hierarchy.

24. The wireless communication apparatus according to claim 5, wherein the second reservation slots include weak reserved slots, the station transmitting the beacon being prohibited from transmitting during weak reserved slots until a predetermined time elapses.

25. A wireless communication method performing data transmission in a wireless communication environment, comprising:
   gathering information indicative of available communication channel slots with respect thereto, the available communication channel slots being portions of an ad-hoc managed bandwidth including communication slots available to others of a plurality of wireless communication apparatus, the information indicative of available communication slots identifying a current reservation state of the available communication slots based upon a predetermined hierarchy as the information indicative of available communication slots, for use in scheduling available time slots for use in communication;
   identifying available slots as unusable and usable slots based upon the hierarchy, the identifying including ranking reservation states including at least a reserved slot and a transmit beacon slot with the predetermined hierarchy, the identifying including determining unusable slots based on the current reservations states of available communication slots of others of the plurality of communication stations;

setting available slots as usable and unusable by the wireless communication apparatus;

controlling communication operation based on the usable and unusable slots set; and informing others of the plurality of communication stations of current reservation states of available communication slots in accordance with the predetermined hierarchy as the information indicative of available communication slots and the determined unusable slots, the informing including transmitting a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon.

26. A tangible computer readable storage medium encoded with computer instructions which causes a data processor to execute a method of controlling a wireless communication operation to implement data transmission in a wireless communication environment, said method comprising:

gathering information indicative of available communication channel slots with respect thereto, the available communication channel slots being portions of an ad-hoc managed bandwidth including communication slots available to others of a plurality of wireless communication apparatus, the information indicative of available communication slots identifying a current reservation state of the available communication slots based upon a predetermined hierarchy for use in scheduling available time slots for use in communication;

identifying available slots as unusable and usable slots based upon the hierarchy, the identifying including ranking reservation states including at least a reserved slot and a transmit beacon slot with the predetermined hierarchy, the identifying including determining unusable slots based on the current reservations states of available communication slots of others of the plurality of communication stations;

setting available slots as usable and unusable by the wireless communication apparatus;

controlling communication operation based on the usable and unusable slots set; and informing others of the plurality of communication stations of current reservation states of available communication slots in accordance with the predetermined hierarchy as the information indicative of available communication slots and the determined unusable slots, the informing including transmitting a beacon to the others of the plurality of communication stations, the beacon including a status for every communication slot in each frame, the status indicating first reservation slots identifying slots reserved for a station transmitting the beacon and second reservation slots identifying slots reserved by neighboring stations other than the station transmitting the beacon.

* * * * *